US011126383B2

(12) United States Patent
Mitani et al.

(10) Patent No.: US 11,126,383 B2
(45) Date of Patent: Sep. 21, 2021

(54) INFORMATION PROCESSING DEVICE INCLUDING FIRST AND SECOND NETWORK INTERFACES

(71) Applicant: Oki Data Corporation, Tokyo (JP)

(72) Inventors: Syuhei Mitani, Tokyo (JP); Keisuke Watanabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/816,155

(22) Filed: Mar. 11, 2020

(65) Prior Publication Data

US 2020/0310706 A1 Oct. 1, 2020

(30) Foreign Application Priority Data

Mar. 28, 2019 (JP) .............................. JP2019-062710

(51) Int. Cl.
*G06F 3/12* (2006.01)
(52) U.S. Cl.
CPC .......... *G06F 3/1221* (2013.01); *G06F 3/1231* (2013.01); *G06F 3/1236* (2013.01); *G06F 3/1286* (2013.01); *G06F 3/1292* (2013.01)
(58) Field of Classification Search
USPC ..................................... 358/1.15, 1.13, 1.14
See application file for complete search history.

(56) References Cited

U.S. PATENT DOCUMENTS

| 2004/0266424 | A1* | 12/2004 | Park | H04L 12/5692 |
| | | | | 455/426.1 |
| 2010/0100646 | A1* | 4/2010 | Park | H04L 12/413 |
| | | | | 710/8 |
| 2011/0051689 | A1* | 3/2011 | Premec | H04W 8/087 |
| | | | | 370/331 |
| 2011/0153815 | A1* | 6/2011 | Aoki | H04L 61/2046 |
| | | | | 709/224 |
| 2013/0084812 | A1* | 4/2013 | Churei | H04W 52/028 |
| | | | | 455/73 |

FOREIGN PATENT DOCUMENTS

JP 2010-51033 A 3/2010

* cited by examiner

*Primary Examiner* — Miya J Williams
(74) *Attorney, Agent, or Firm* — Metrolex IP Law Group, PLLC

(57) ABSTRACT

One or more embodiments may relate to an information processing device connectable to a network and including interfaces in which network identification numbers can be set. The information processing device may include: a network connection determination processor that determines whether or not first and second interfaces of the interfaces are connected on a same network; an identification number setting processor that sets, when the first and second interfaces are connected on the same network, a network identification number of one of the first and second interfaces in the other interface; and a stop-startup processor that stops the one of the first and second interfaces.

6 Claims, 23 Drawing Sheets

FIG. 6

| INTERFACE | MAC ADDRESS | IP ADDRESS |
|---|---|---|
| WIRELESS INTERFACE | 00-25-36-2e-5d-5e | 192.168.10.1 |
| WIRED INTERFACE | 00-25-36-2e-5d-5f | 192.168.11.1 |

FIG. 7

| INTERFACE | MAC ADDRESS | IP ADDRESS |
|---|---|---|
| WIRELESS INTERFACE | 00-25-36-2e-5d-5e | - |
| WIRED INTERFACE | 00-25-36-2e-5d-5f | 192.168.11.1<br>192.168.10.1 |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0x00 | ff | ff | ff | ff | ff | ff | aa | bb | cc | dd | ee | 22 | 08 | 08 | 14 | 15 |
| 0x10 | 08 | 00 | 08 | 04 | 00 | 01 | aa | bb | cc | dd | ee | 22 | c0 | a8 | 00 | 01 |
| 0x20 | 00 | 00 | 00 | 00 | 00 | 00 | c0 | a8 | 01 | 15 | | | | | | |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0x00 | aa | bb | cc | dd | ee | 22 | aa | bb | cc | dd | ee | 21 | 08 | 08 | 00 | 15 |
| 0x10 | 08 | 00 | 08 | 04 | 00 | 02 | aa | bb | cc | dd | ee | 21 | c0 | a8 | 01 | 01 |
| 0x20 | aa | bb | cc | dd | ee | 22 | c0 | a8 | 01 | 16 | | | | | | |

FIG. 23

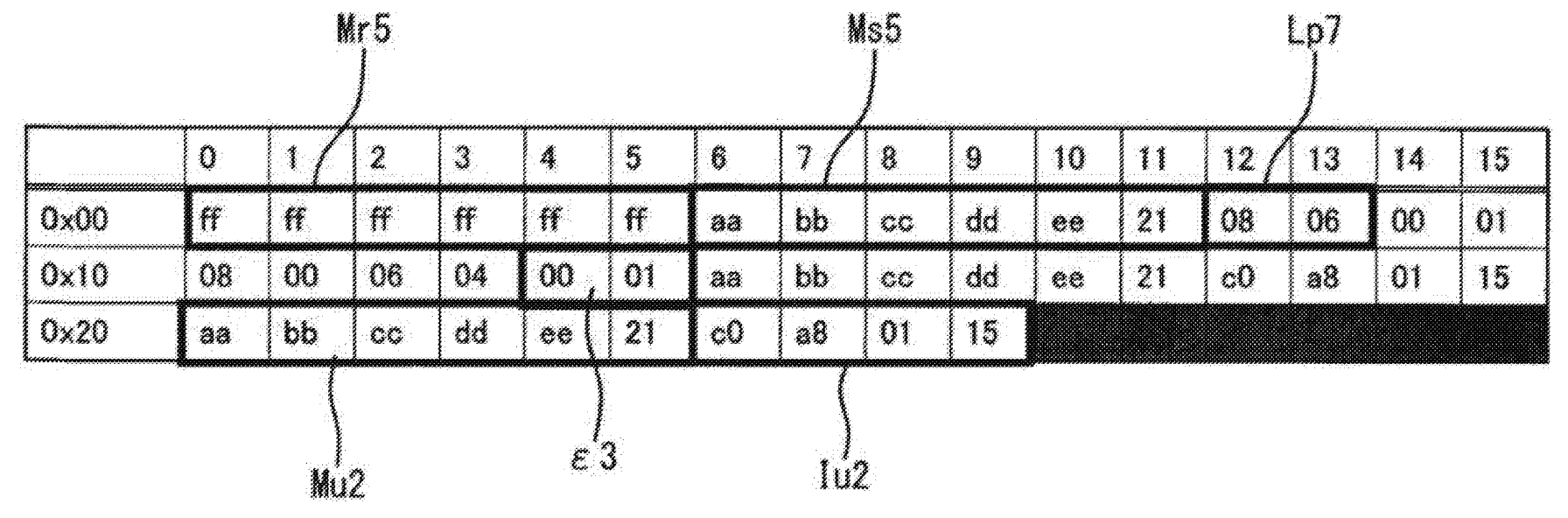

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0x00 | ff | ff | ff | ff | ff | ff | aa | bb | cc | dd | ee | 21 | 08 | 06 | 00 | 15 |
| 0x10 | 08 | 00 | 06 | 04 | 00 | 01 | aa | bb | cc | dd | ee | 21 | 08 | 06 | 00 | 01 |
| 0x20 | aa | bb | cc | dd | ee | 21 | c0 | a8 | 01 | 15 | | | | | | |

Mr5, Ms5, Lp7, Mu2, ε3, Iu2

INFORMATION PROCESSING DEVICE INCLUDING FIRST AND SECOND NETWORK INTERFACES

CROSS REFERENCE TO RELATED APPLICATIONS

This application claims priority based on 35 USC 119 from prior Japanese Patent Application No. 2019-062710 filed on Mar. 28, 2019, entitled "INFORMATION PROCESSING DEVICE", the entire contents of which are incorporated herein by reference.

BACKGROUND

The disclosure may relate to information processing devices.

In a related art, in an information processing system in which an information processing device such as a printer, a copying machine, a facsimile or a multifunctional machine, (for example, a printer) and external devices, (for example, personal computers) are connected through a network, the individual personal computers can access the printer.

In the information processing system, interfaces which are compliant with the Ethernet (registered trademark) standard, for example, a wireless interface for wirelessly connecting to the network by use of radio waves and a wired interface for connecting by wire to the network by use of cables are provided in the printer, and each of the personal computers selects one of the wireless interface and the wired interface so as to be able to access the printer.

Incidentally, both a wireless interface and a wired interface are left in a state where they are started up, and thus the amount of consumption of power of a printer is increased.

Hence, a printer is provided in which when a wireless interface and a wired interface are connected to a network, one of the wireless interface and the wired interface is stopped.

In the printer, both the wireless interface and the wired interface are prevented from being left in a state where they are started up, and thus it is possible to reduce the amount of consumption of power of the printer (see, for example, patent literature 1).

Patent Literature 1: Japanese Patent Application Publication No. 2010-51033

SUMMARY

However, in the printer described above, since an IP address serving as a network identification number is associated with each of the wireless interface and the wired interface, and thus personal computers access the printer based on the IP addresses, when one of the wireless interface and the wired interface is stopped, each of the personal computers cannot access the printer through the interface which is stopped.

An object of an aspect of one or more embodiments may be to provide an information processing device capable of reducing the amount of the consumption power and being reliably accessed from external devices.

A first aspect of one or more embodiments may be an information processing device connectable to a network and including interfaces in which network identification numbers can be set.

The information processing device according to the first aspect may include: a network connection determination processor that determines whether or not first and second interfaces of the interfaces are connected on the same network; an identification number setting processor that sets, when the first and second interfaces are connected on the same network, a network identification number of one of the first and second interfaces in the other interface; and a stop-startup processor that stops the one of the first and second interfaces.

A second aspect of one or more embodiments may be an information processing device connectable to an external device on a network and including interfaces.

The information processing device according to the second aspect may include: a power mode setting part that sets, in the information processing device, a first mode or a second mode in which power consumption is lower than in the first mode; a network connection determination processor that determines whether or not first and second interfaces of the interfaces are connected on the same network; a communication start determination processor that determines whether or not the external device starts to communicate with one of the first and second interfaces; and a stop-startup processor that stops the one of the first and second interfaces when the network connection determination processor determines that the first and second interfaces are connected on the same network and that restarts the one of the first and second interfaces when the communication start determination processor determines that the external device starts to communicate with the one of the first and second interfaces.

According to at least one of the aspects described above, when the first and second interfaces are connected on the same network, the network identification number of the one of the first and second interfaces is set in the other interface, and the one of the first and second interfaces is stopped, with the result that even when any one of the network identification number of the one of the first and second interfaces and the network identification number of the other interface is used in the other interface, the information processing device can respond to an external device.

Hence, the amount of consumption of power of the information processing device can be reduced, and the information processing device can be reliably accessed from external devices.

BRIEF DESCRIPTION OF DRAWINGS

FIG. 6 is a diagram illustrating a first view of examples of addresses of a wireless interface and a wired interface according to a first embodiment;

FIG. 7 is a diagram illustrating a second view of examples of the addresses of the wireless interface and the wired interface according to a first embodiment;

FIG. 19 is a diagram illustrating a view of an example of a TCP which is transmitted from a personal computer to the second port of the printer according to a second embodiment;

FIG. 21 is a diagram illustrating a view of an example of an ARP for searching the second port of the printer in the personal computer according to a second embodiment;

FIG. 22 is a diagram illustrating a view of an example of an ARP Rsp which is transmitted from the second port of the printer to the personal computer according to a second embodiment;

FIG. 23 is a diagram illustrating a view of an example of a GARP which is transmitted broadcast from the second port of the printer to a network according to a second embodiment.

DETAILED DESCRIPTION

Figure 1:
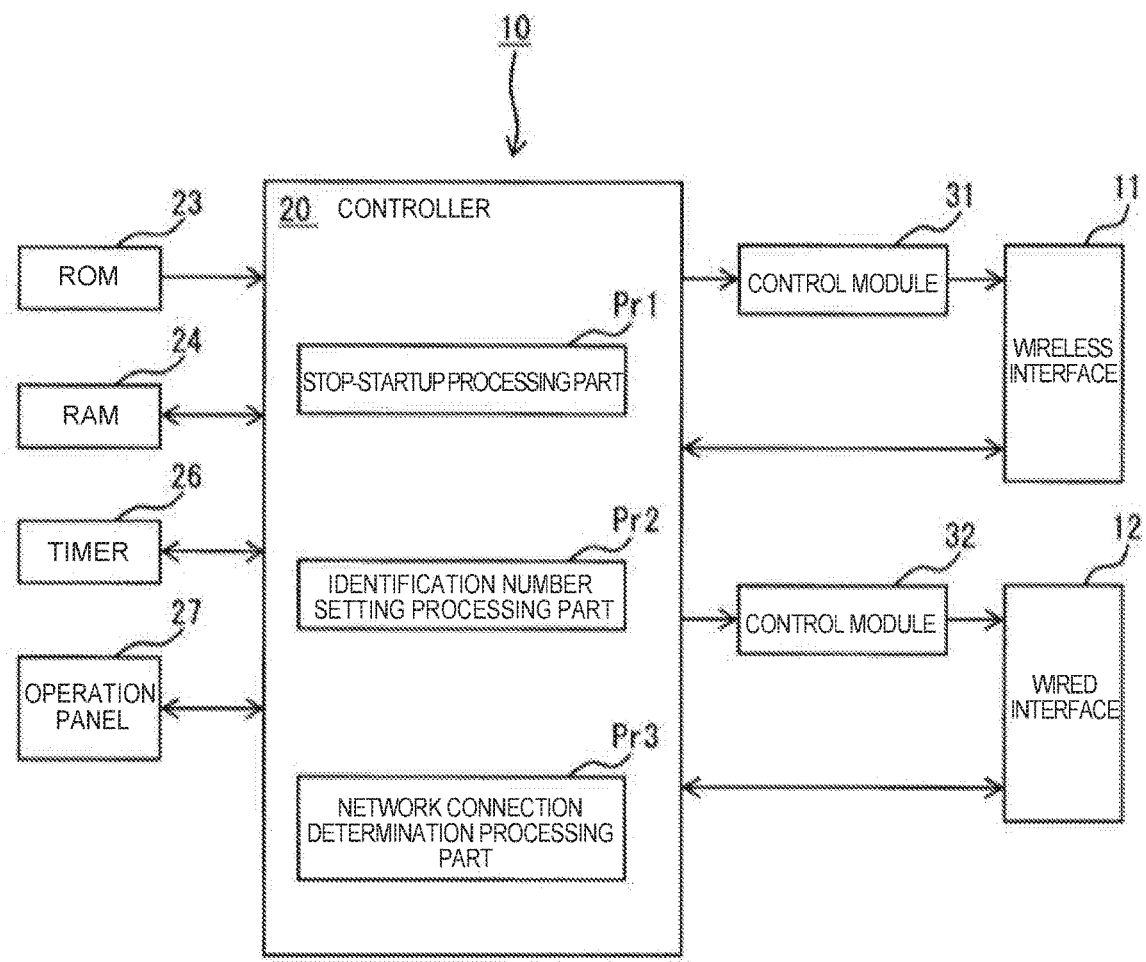
FIG. 1 is a control block diagram of a printer according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

An information processing system is described below in which a printer serving both as an information processing device for image formation and as an image formation device and personal computers serving as external devices are connected on a network. A first example of the information processing system is first described.

Figure 2:
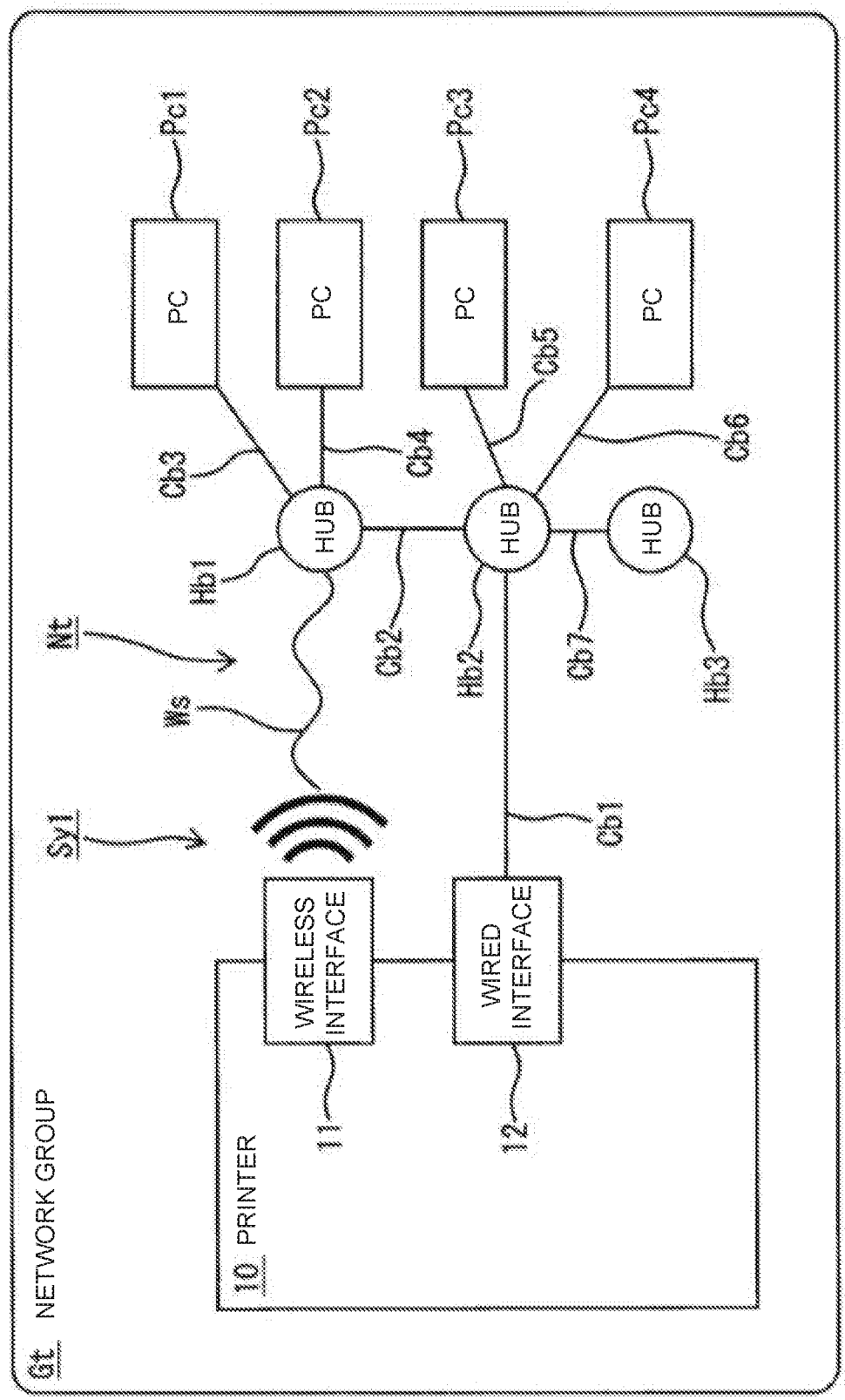
FIG. 2 is a diagram illustrating a view of a first example of an information processing system according to a first embodiment.

FIG. 2 is a diagram illustrating a first example of the information processing system according to a first embodiment.

In the figure, Sy1 represents the information processing system, 10 represents the printer, Pci (i=1, 2, . . . and 4) represent the personal computers, Nt represents the network which connects the printer 10 and the personal computers Pci, Hbj (j=1, 2 and 3) represent hubs, Cbk (k=1, 2, . . . and 7) represent cables and Ws represents wireless connection.

The printer 10, the personal computers Pci, the hubs Hbj, the cables Cbk, the wireless connection Ws and the like constitute a network group Gt.

The hub Hb1 collects the wireless connection Ws and the cables Cb2 to Cb4, the hub Hb2 collects the cables Cb1, Cb2 and Cb5 to Cb7 and the hub Hb3 collects the cable Cb7. Each of the hubs Hbj serves as a relay point which connects together nodes that are formed with the printer 10 and the personal computers Pci, and for example, when the hub receives a packet from a predetermined node, a separate hub or the like, the hub analyzes an IP address included in the packet so as to transmit the packet to an appropriate node, a predetermined hub or the like.

The printer 10 can be connected to the network Nt which is compliant with the Ethernet (registered trademark) standard, is connected on the same network Nt to the personal computers Pci and includes interfaces, and among the interfaces, a wireless LAN is connected to a wireless interface 11 serving as a first interface and a wired LAN is connected to a wired interface 12 serving as a second interface.

In each of the wireless interface 11 and the wired interface 12, a later-described unchangeable unique MAC address (FIG. 6) serving as a first network identification number is set at the time of shipment, and an IP address serving as a second network identification number, which can be changed by an operator (user) after shipment, is set.

The wireless connection Ws is compliant with, for example, the IEEE 802.11n standard so as to perform communication with a frequency band of 5 [GHz]. As the cables Cbk, cables which are specified in the TIA/EIA-566-B standard and which corresponds to Category 5e are used, and thus communication is performed in compliance with the 100BASE-TX standard.

In the network Nt, since all the nodes, that is, the printer 10 and the individual personal computers Pci are connected on the same network Nt, the individual personal computers Pci can freely access the printer 10 both through the wireless interface 11 and through the wired interface 12.

A predetermined personal computer among the personal computers Pci which is a host computer serving as a high level device transmits a print job to the printer 10. In an embodiment, the individual personal computers Pci are connected to the printer 10. However, other printers, copying machines, facsimiles, multifunctional machines, digital video cameras or the like, as external devices, may also be connected to the printer 10, instead of the personal computers Pci.

A second example of the information processing system is then described.

Figure 3:
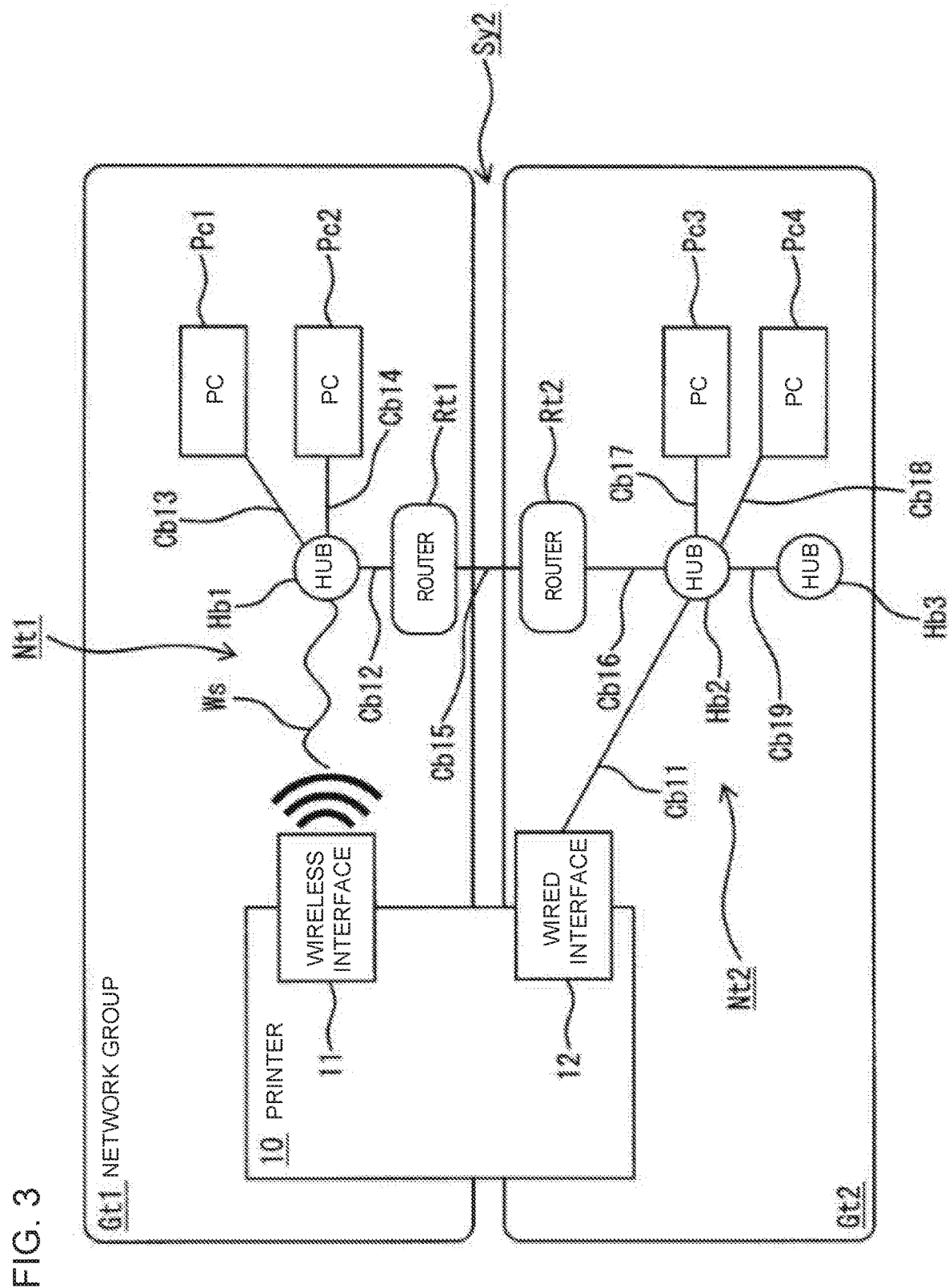
FIG. 3 is a diagram illustrating a view of a second example of the information processing system according to a first embodiment.

FIG. 3 is a diagram illustrating a second example of the information processing system according to a first embodiment.

In the figure, Sy2 represents the information processing system, 10 represents the printer, Pci (i=1, 2, . . . and 4) represent the personal computers, Nt2 represents a network which connects the printer 10 and the personal computers Pc1 and Pc2, Nt3 represents a network which connects the printer 10 and the personal computers Pc3 and Pc4, Hbj (j=1, 2 and 3) represent the hubs, Cbm (m=11, 12, . . . and 19) represent cables, Ws represents the wireless connection and Rt1 and Rt2 represent routers for security of the networks Nt1 and Nt2.

The hub Hb1 collects the wireless connection Ws and the cables Cb12 to Cb14, the hub Hb2 collects the cables Cb11 and Cb16 to Cb19 and the hub Hb3 collects the cable Cb19. The routers Rt1 and Rt2 are connected with the cable Cb15.

The printer 10 is connected to the personal computers Pci, and includes the wireless interface 11 and the wired interface 12, and the wireless LAN is connected to the wireless interface 11 and the wired LAN is connected to the wired interface 12.

The printer 10, the personal computers Pc1 and Pc2, the hub Hb1, the cables Cb12 to Cb14, the wireless connection Ws, the router Rt1 and the like constitute a network group Gt1, and the printer 10, the personal computers Pc3 and Pc4, the hubs Hb2 and Hb3, the cables Cb11 and Cb16 to Cb19, the router Rt2 and the like constitute a network group Gt2.

In the information processing system Sy2, since access between the networks Nt1 and Nt2 is interrupted with the routers Rt1 and Rt2, for example, the personal computer Pc2 can access the wireless interface 11 of the printer 10 but cannot access the wired interface 12 whereas the personal computer Pc3 can access the wired interface 12 of the printer 10 but cannot access the wireless interface 11.

The control device of the printer 10 is then described.

FIG. 1 is a control block diagram of the printer according to a first embodiment.

In the figure, 10 represents the printer, 11 represents the wireless interface, 12 represents the wired interface, 20 represents a controller which performs the entire control of the printer 10, 23 represents a ROM which serves as a first storage, 24 represents a RAM which serves as a second storage, 26 represents a timer which serves as a time measurement member, 27 represents an operation panel which includes an operation portion and a display portion that are not illustrated, 31 represents a control module which performs the control of the wireless interface 11 and 32 represents a control module which performs the control of the wired interface 12.

The controller 20 includes an unillustrated CPU which serves as a computation device or a processor, and performs various types of processing based on programs recorded in the ROM 23. In the ROM 23, not only the programs but also various types of initial values, setting values and the like are recorded, and in the RAM 24, various types of data are temporarily recorded.

The controller 20 includes a stop-startup processing part Pr1 serving as a stop-startup processor, an identification number setting processing part Pr2 serving as an identification number setting processor, a network connection determination processing part Pr3 serving as a network connection determination processor, and the like.

When the power of the printer 10 is turned on, the stop-startup processing part Pr1 determines whether or not startup conditions are satisfied, and when the startup conditions are satisfied, the stop-startup processing part Pr1 starts up the wireless interface 11 and the wired interface 12 so as to activate the wireless interface 11 and the wired interface 12 for the network Nt, and thereafter stops one of the wireless interface 11 and the wired interface 12 so as to inactivate it for the network Nt.

The identification number setting processing part Pr2 changes or erases, based on an instruction from the stop-startup processing part Pr1, the settings of the IP addresses in the wireless interface 11 and the wired interface 12.

The network connection determination processing part Pr3 determines whether or not the wireless interface 11 and the wired interface 12 are connected on the same network Nt.

The operation of the controller 20 is then described.

Figure 4:
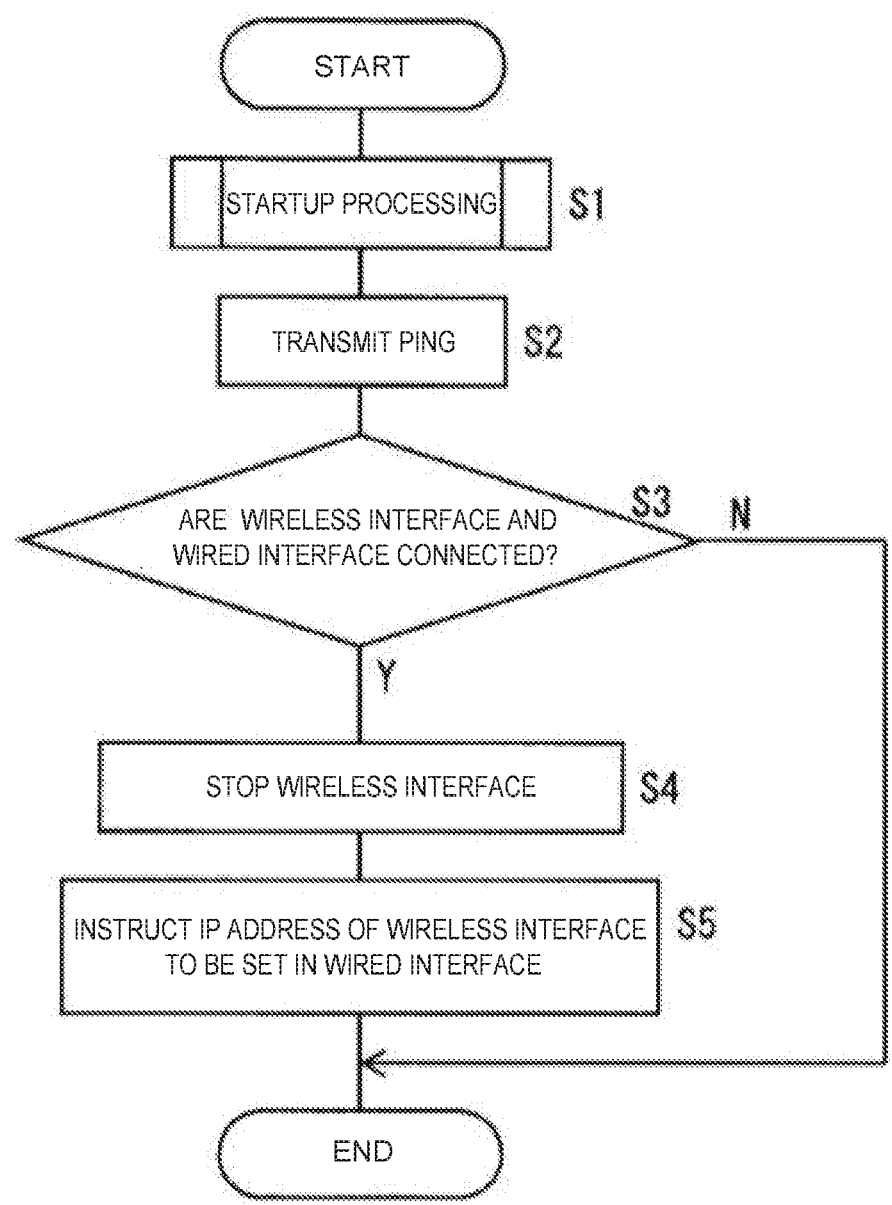
FIG. 4 is a diagram illustrating a flowchart of an operation of a controller according to a first embodiment.
Figure 5:
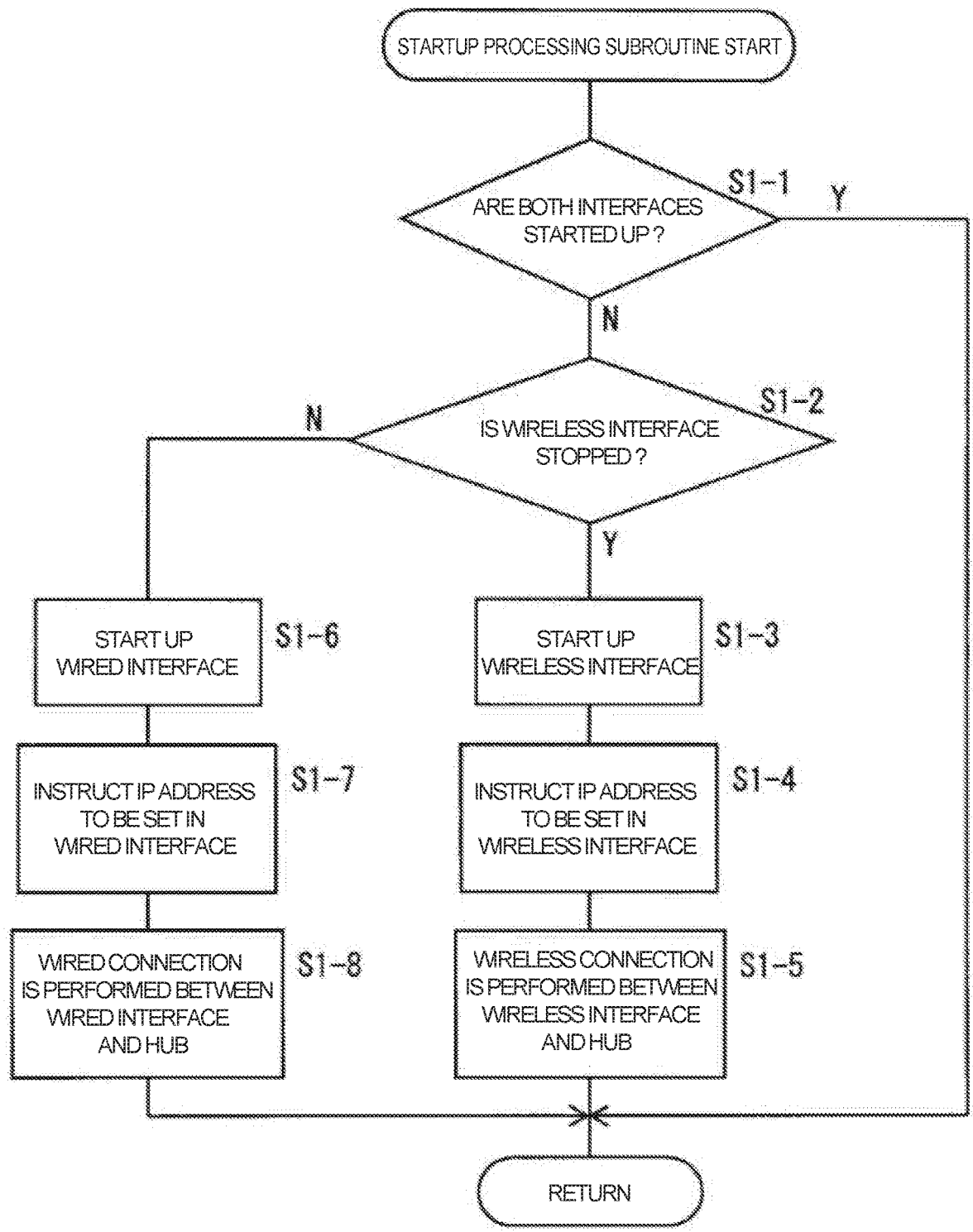
FIG. 5 is a diagram illustrating a flowchart of the subroutine of startup processing according to a first embodiment.

FIG. 4 is a flowchart illustrating the operation of the controller according to a first embodiment, FIG. 5 is a diagram illustrating the subroutine of startup processing according to a first embodiment, FIG. 6 is a first view illustrating examples of addresses of the wireless interface and the wired interface according to a first embodiment and FIG. 7 is a second view illustrating examples of the addresses of the wireless interface and the wired interface according to a first embodiment.

The stop-startup processing part Pr1 first determines whether or not a power saving mode is set in the printer 10. The operator operates the operation panel 27 so as to set the power saving mode.

When the power saving mode is set in the printer 10, the stop-startup processing part Pr1 determines whether or not the startup conditions are satisfied, and when the startup conditions are satisfied, the stop-startup processing part Pr1 performs the startup processing so as to start up the wireless interface 11 and the wired interface 12.

In this case, the startup conditions are set such that whether or not the setting of the wireless interface 11 is changed by the operator, for example, whether or not the IP address is changed is a first determination condition, that whether or not the setting of the wired interface 12 is changed by the operator, for example, whether or not the IP address is changed is a second determination condition and that whether or not a predetermined time elapses after the startup conditions are previously satisfied, for example, whether or not four hours elapse in an embodiment is a third determination condition, and when at least one of the first to third determination conditions is satisfied, the startup conditions are satisfied whereas when none of the first to third determination conditions is satisfied, the startup conditions are not satisfied. In order to determine whether or not the third condition is satisfied, the stop-startup processing part Pr1 starts to measure time with the timer 26 after the startup conditions are satisfied.

In the startup processing, the stop-startup processing part Pr1 first determines whether or not the wireless interface 11 and the wired interface 12 (both the interfaces) are started up, and when the wireless interface 11 and the wired interface 12 are not started up, the stop-startup processing part Pr1 determines whether or not the wireless interface 11 is stopped.

Then, when the wireless interface 11 is stopped, the stop-startup processing part Pr1 turns on the power of the control module 31 for the wireless interface 11 and transmits a control clock to the control module 31 so as to start up the wireless interface 11.

Then, the stop-startup processing part Pr1 instructs the identification number setting processing part Pr2 to set the IP address in the wireless interface 11.

The identification number setting processing part Pr2 receives the instruction from the stop-startup processing part Pr1 so as to set an IP address 192.168.10.1 produced by the operator and illustrated in FIG. 6 in the wireless interface 11 through the control module 31 and to associate the IP address 192.168.10.1 with the wireless interface 11.

Here, when as illustrated in FIG. 7, the same IP address 192.168.10.1 has already been associated with the wired interface 12 by the instruction from the stop-startup processing part Pr1, the IP address 192.168.10.1 associated with the wired interface 12 is erased.

In this way, in the network Nt, when the wired interface 12 has responded to access using the IP address 192.168.10.1 from a predetermined personal computer to the printer 10, a change can be made such that the wired interface 12 is prevented from responding thereto.

When the wireless interface 11 is started up in this way, the stop-startup processing part Pr1 performs wireless connection between the wireless interface 11 and the hub Hb1. Specifically, the stop-startup processing part Pr1 notifies a combination of a MAC address 00-25-36-2e-5d-5e and the IP address 192.168.10.1 illustrated in FIG. 6 and set in the wireless interface 11 to the entire network Nt through the hub Hb1 as an ARP Res (Address Resolution Protocol Response) which is a specific packet response.

The ARP Res is a protocol for notifying the combination of the MAC address and the IP address to the individual personal computers Pci, and when the individual personal computers Pci receive the ARP Res, each of the personal computers Pci updates an unillustrated ARP table which is possessed by itself and which is a combination table of the MAC address and the IP address.

When the individual personal computers Pci receive the ARP Res, the ARP table is updated in each of the personal computers Pci, and thus access using the IP address 192.168.10.1 from the individual personal computers Pci is not access to the wired interface 12 in the printer 10 but access to the wireless interface 11 therein.

On the other hand, when the wireless interface 11 is not stopped and the wired interface 12 is stopped, the stop-startup processing part Pr1 turns on the power of the control module 32 for the wired interface 12 and transmits the control clock to the control module 32 so as to start up the wired interface 12.

Then, the stop-startup processing part Pr1 instructs the identification number setting processing part Pr2 to set the IP address in the wired interface 12.

The identification number setting processing part Pr2 receives the instruction from the stop-startup processing part Pr1 so as to set an IP address 192.168.11.1 produced by the operator and illustrated in FIG. 6 in the wired interface 12 through the control module 32 and to associate the IP address 192.168.11.1 with the wired interface 12.

When the wired interface 12 is started up in this way, the stop-startup processing part Pr1 performs wired connection between the wired interface 12 and the hub Hb2. Specifically, the stop-startup processing part Pr1 notifies a combination of a MAC address 00-25-36-2e-5d-5f and the IP address 192.168.11.1 illustrated in FIG. 6 and set in the wired interface 12 to the entire network Nt through the hub Hb2 as the ARP Res.

When the individual personal computers Pci receive the ARP Res, the ARP table is updated in each of the personal computers Pci, and thus access using the IP address 192.168.11.1 from the individual personal computers Pci is not access to the wireless interface 11 in the printer 10 but access to the wired interface 12 therein.

When both the wireless interface 11 and the wired interface 12 are started up in this way, the network connection determination processing part Pr3 determines whether or not the wireless interface 11 and the wired interface 12 are connected on the same network Nt. Hence, the network connection determination processing part Pr3 transmits PING from one of the wired interface 12 and the wireless interface 11 to the other, for example, from the wired interface 12 to the wireless interface 11, so as to determine whether or not the wireless interface 11 and the wired interface 12 are connected on the network Nt.

The PING is software which is used in order to determine whether or not a node on a side to which the PING is transmitted, that is, a transmission-side node and a node on a side which receives the PING, that is, a reception-side node are connected on the network Nt. For example, after the transmission-side node transmits Echo Message of ICMP (Internet Control Message Protocol) to the reception-side node, whether or not Echo Reply Message serving as a PING response is returned from the reception-side node to the transmission-side node is checked, and thus whether or not the transmission-side node and the reception-side node are connected on the network Nt is determined.

Then, when the Echo Reply Message is returned from the wireless interface 11 to the wired interface 12, the network connection determination processing part Pr3 determines that the wireless interface 11 and the wired interface 12 are connected on the same network Nt.

Then, in order to reduce the amount of consumption of power in the interface, the stop-startup processing part Pr1 stops one of the wireless interface 11 and the wired interface 12, for example, stops the wireless interface 11.

Hence, the stop-startup processing part Pr1 turns off the power of the control module 31 for the wireless interface 11, and stops the transmission of the control clock to the control module 31 so as to stop the wireless interface 11. In this way, the individual personal computers Pci cannot access the printer 10 through the wireless interface 11.

Then, the stop-startup processing part Pr1 instructs the identification number setting processing part Pr2 to set the IP address of the wireless interface 11 in the wired interface 12.

The identification number setting processing part Pr2 receives the instruction from the stop-startup processing part Pr1 so as to set, as illustrated in FIG. 7, in the wired interface 12, the IP address 192.168.10.1 illustrated in FIG. 6 and set in the wireless interface 11 and to associate the IP address 192.168.10.1 with the wired interface 12. In this way, as the IP address of the wired interface 12, the two IP addresses 192.168.11.1 and 192.168.10.1 are set.

Here, the identification number setting processing part Pr2 erases the IP address 192.168.10.1 set in the wireless interface 11.

Then, the stop-startup processing part Pr1 notifies a combination of the MAC address 00-25-36-2e-5d-5f and the IP addresses 192.168.11.1 and 192.168.10.1 in the wired interface 12 to the entire network Nt through the hub Hb2 as the ARP Res.

Since each of the individual personal computers Pci which receives the ARP Res in the network Nt updates the ARP table possessed by itself, as with access to the IP address 192.168.11.1, access to the IP address 192.168.10.1 is access to the wired interface 12 in the printer 10.

Hence, even when each of the individual personal computers Pci uses any one of the IP addresses 192.168.10.1 and 192.168.11.1, the personal computer can access the printer 10 through the wired interface 12.

When the wired interface 12 of the wireless interface 11 and the wired interface 12 is stopped, the stop-startup processing part Pr1 turns off the power of the control module 32 for the wired interface 12, and stops the transmission of the control clock to the control module 32 so as to stop the wired interface 12. In this way, the individual personal computers Pci cannot access the printer 10 through the wired interface 12.

Then, the stop-startup processing part Pr1 instructs the identification number setting processing part Pr2 to set the IP address of the wired interface 12 in the wireless interface 11.

On the other hand, when the PING is transmitted from the wired interface 12 to the wireless interface 11, and the Echo Reply Message is not returned from the reception-side node to the transmission-side node, it is assumed that the wireless interface 11 and the wired interface 12 are not connected on the same network Nt and that for example, as illustrated in FIG. 3, the wireless interface 11 and the wired interface 12 are connected to the different networks Nt1 and Nt2.

In this case, when one of the wireless interface 11 and the wired interface 12, for example, the wireless interface 11 is stopped, the personal computers Pc1 and Pc2 in the network Nt1 to which the wireless interface 11 is connected cannot access the printer 10 through any one of the wireless interface 11 and the wired interface 12.

The flowchart of FIG. 4 is then described.

In step S1, the stop-startup processing part Pr1 performs the startup processing.

In step S2, the network connection determination processing part Pr3 transmits the PING from the wired interface 12 to the wireless interface 11.

In step S3, the network connection determination processing part Pr3 determines whether or not the wireless interface 11 and the wired interface 12 are connected on the same network Nt. When the wireless interface 11 and the wired interface 12 are connected on the same network Nt, the processing proceeds to step S4 whereas when the wireless interface 11 and the wired interface 12 are not connected on the same network Nt, the processing is completed.

In step S4, the stop-startup processing part Pr1 stops the wireless interface 11.

In step S5, the stop-startup processing part Pr1 instructs the identification number setting processing part Pr2 to set the IP address of the wireless interface 11 in the wired interface 12, and completes the processing.

The flowchart of FIG. 5 is then described.

In step S1-1, the stop-startup processing part Pr1 determines whether or not both the interfaces are started up. When both the interfaces are started up, the processing is returned whereas when both the interfaces are not started up, the processing proceeds step S1-2.

In step S1-2, the stop-startup processing part Pr1 determines whether or not the wireless interface 11 is stopped. When the wireless interface 11 is stopped, the processing proceeds to step S1-3 whereas when the wireless interface 11 is not stopped, the processing proceeds to step S1-6.

In step S1-3, the stop-startup processing part Pr1 starts up the wireless interface 11.

In step S1-4, the stop-startup processing part Pr1 instructs the identification number setting processing part Pr2 to set the IP address in the wireless interface 11.

In step S1-5, the stop-startup processing part Pr1 performs wireless connection between the wireless interface 11 and the hub Hb1, and the processing is returned.

In step S1-6, the stop-startup processing part Pr1 starts up the wired interface 12.

In step S1-7, the stop-startup processing part Pr1 instructs the identification number setting processing part Pr2 to set the IP address in wired interface 12.

In step S1-8, the stop-startup processing part Pr1 performs wireless connection between the wired interface 12 and the hub Hb2, and the processing is returned.

As described above, when the wireless interface 11 and the wired interface 12 are connected on the same network Nt, the IP address of the wireless interface 11 is set in the wired interface 12, and thus the wireless interface 11 is stopped, with the result that even when in the wired interface 12, any one of the IP address of the wireless interface 11 and the IP address of the wired interface 12 is used, the printer 10 can respond to the personal computers Pci.

Hence, the amount of consumption of power of the printer 10 can be reduced, and moreover, the printer 10 can be reliably accessed from the personal computers Pci.

Each time the startup conditions are satisfied, the network connection determination processing part Pr3 determines whether or not the wireless interface 11 and the wired interface 12 are connected on the same network Nt, and thus it is possible to constantly check the state of the network Nt, for example, whether or not the IP address is changed by the operator.

In an embodiment, each one of the wireless interface 11 and the wired interface 12 is provided in the printer 10. However, in a modification, a plurality of wireless interfaces 11 and a plurality of wired interfaces 12 may be provided in the printer 10.

In an embodiment, the wireless interface 11 among the wireless interface 11 and the wired interface 12 is stopped. However, in a modification, conditions under which the interface to be stopped is selected may be previously set with consideration given to the amount of consumption of power of the wireless interface 11 and the wired interface 12, the communication speeds thereof and the like. Furthermore, in a modification, the display portion of the operation panel 27 may display choices such that the operator can select which one of the wireless interface 11 and the wired interface 12 is to be stopped.

Incidentally, in the present embodiment, when the wireless interface 11 and the wired interface 12 are connected on the same network Nt, the wireless interface 11 is stopped, and the IP address of the wireless interface 11 is set in the wired interface 12, with the result that it is impossible to sufficiently utilize the performance of the wireless interface 11 which is stopped.

Hence, a second embodiment is described in which when the wireless interface 11 and the wired interface 12 are connected on the same network Nt, one of the wireless interface 11 and the wired interface 12 is temporarily stopped and can be thereafter restarted as necessary. Configurations which have the same structures as according to a first embodiment are identified with the same symbols, and for effects which are achieved by the provision of the same structures, the effects according to a first embodiment are referenced.

A first example of the information processing system according to a second embodiment is first described. According to a second embodiment, a description is given with the assumption that the interfaces of the printer 10 are ports.

Figure 8:
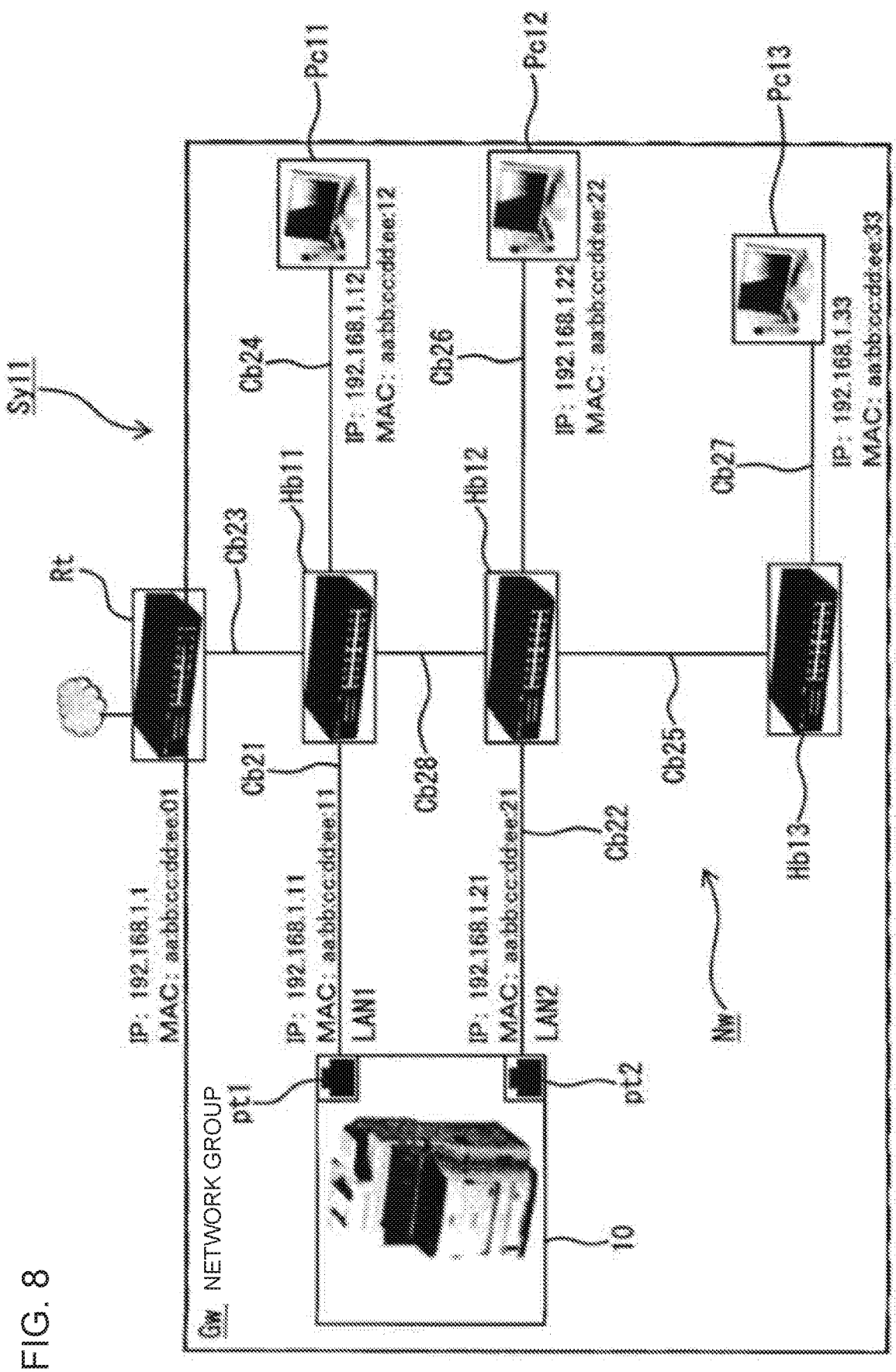
FIG. 8 is a diagram illustrating a view of a first example of an information processing system according to a second embodiment.

FIG. 8 is a diagram illustrating a first example of the information processing system according to a second embodiment.

In the figure, Sy11 represents the information processing system, 10 represents a printer which serves both as an information processing device for image formation and as an image formation device, Pci' (i'=11, 12 and 13) represent personal computers which serve as external devices, Nw represents a network which connects the printer 10 and the personal computers Pci', Hbj' (j'=11, 12 and 13) represent hubs and Cbk' (k'=21, 22, . . . and 28) represent cables.

The printer 10, the personal computers Pci', the hubs Hbj', the cables Cbk' and the like constitute a network group Gw.

The hub Hb11 collects the cables Cb21, Cb23, Cb24 and Cb28, the hub Hb12 collects the cables Cb22, Cb25, Cb26 and Cb28 and the hub Hb13 collects the cables Cb25 and Cb27.

The printer 10 is connected to the personal computers Pci' on the network Nw which is compliant with the TCP/IP, and includes first and second ports pt1 and pt2 as first and second interfaces, and LAN1 and LAN2 which are first and second local area networks are respectively connected to the first and second ports pt1 and pt2.

In this case, a MAC address which serves as a first network identification number of the first port pt1 in the printer 10 is aa:bb:cc:dd:ee:11, and an IP address which serves as a second network identification number is 192.168.1.11, and the MAC address of the second port pt2 is aa:bb:cc:dd:ee:21, and the IP address thereof is 192.168.1.21.

The MAC address of a router Rt is aa:bb:cc:dd:ee:01, and the IP address thereof is 192.168.1.1.

The MAC address of the personal computer Pc11 is aa:bb:cc:dd:ee:12, and the IP address thereof is 192.168.1.12, the MAC address of the personal computer Pc12 is aa:bb:cc:dd:ee:22, and the IP address thereof is 192.168.1.22 and the MAC address of the personal computer Pc13 is aa:bb:cc:dd:ee:33 and the IP address thereof is 192.168.1.33.

A second example of the information processing system in which the network is separated into two is then described.

Figure 9:
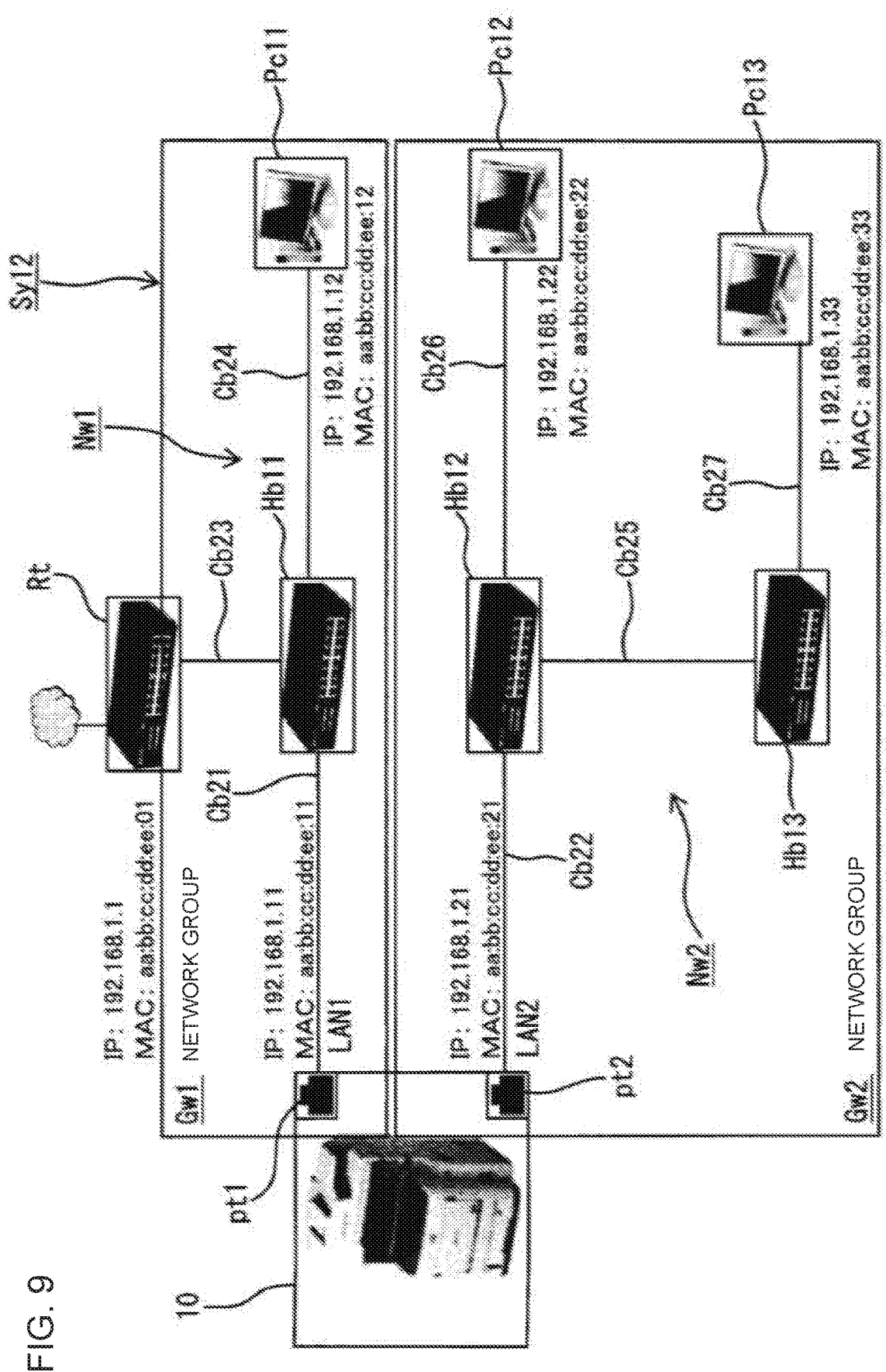
FIG. 9 is a diagram illustrating a view of a second example of the information processing system according to a second embodiment.

FIG. 9 is a diagram illustrating a second example of the information processing system according to a second embodiment.

In the figure, Sy12 represents the information processing system, 10 represents the printer, Pci' (i'=11, 12 and 13) represent the personal computers, Hbj' (j'=11, 12 and 13) represent the hubs, Nw1 represents a network which connects the printer 10 and the personal computer Pc11, Nw2 represents a network which connects the printer 10 and the personal computers Pc12 and Pc13 and Cbk' (k'=21, 22, . . . and 27) represent cables.

The hub Hb11 collects the cables Cb21, Cb23 and Cb24, the hub Hb12 collects the cables Cb22, Cb25 and Cb26 and the hub Hb13 collects the cables Cb25 and Cb27.

In this case, there is no cable which connects between the hubs Hb11 and Hb12, and thus the network is separated into the networks Nw1 and Nw2.

The printer 10 is connected to the personal computer Pc11 on the network Nw1 and is connected to the personal computers Pc12 and Pc13 on the network Nw2, and includes the first and second ports pt1 and pt2, and LAN1 and LAN2 are respectively connected to the first and second ports pt1 and pt2.

The printer 10, the personal computer Pc11, the hub Hb11, the cables Cb21, Cb23 and Cb24 and the like constitute a network group Gw1, and the printer 10, the personal computers Pc12 and Pc13, the hubs Hb12 and Hb13, the cables Cb22, Cb25, Cb26 and Cb27 and the like constitute a network group Gw2.

In this case, the MAC address of the first port pt1 in the printer 10 is aa:bb:cc:dd:ee:11 and the IP address thereof is 192.168.1.11, and the MAC address of the second port pt2 is aa:bb:cc:dd:ee:21 and the IP address thereof is 192.168.1.21.

The MAC address of the router Rt is aa:bb:cc:dd:ee:01, and the IP address thereof is 192.168.1.1.

The MAC address of the personal computer Pc11 is aa:bb:cc:dd:ee:12 and the IP address thereof is 192.168.1.12, the MAC address of the personal computer Pc12 is aa:bb:cc:dd:ee:22 and the IP address thereof is 192.168.1.22 and the MAC address of the personal computer Pc13 is aa:bb:cc:dd:ee:33 and the IP address thereof is 192.168.1.33.

Here, in the information processing system Sy12, the operator of the personal computer Pc11 registers the IP address 192.168.1.11 of the first port pt1 as an IP address for accessing the printer 10, and the operators of the personal computers Pc12 and Pc13 register the IP address 192.168.1.21 of the second port pt2 as an IP address for accessing the printer 10. Thereafter, the hubs Hb11 and Hb12 in the networks Nw1 and Nw2 are connected with the cable Cb28 (FIG. 8) such that the network Nw is established, and thus in the information processing system Sy11, the operators of the individual personal computers Pci' can use, as the IP address for accessing the printer 10, both of the IP address 192.168.1.11 of the first port pt1 and the IP address 192.168.1.21 of the second port pt2.

The control device of the printer 10 is then described.

Figure 10:
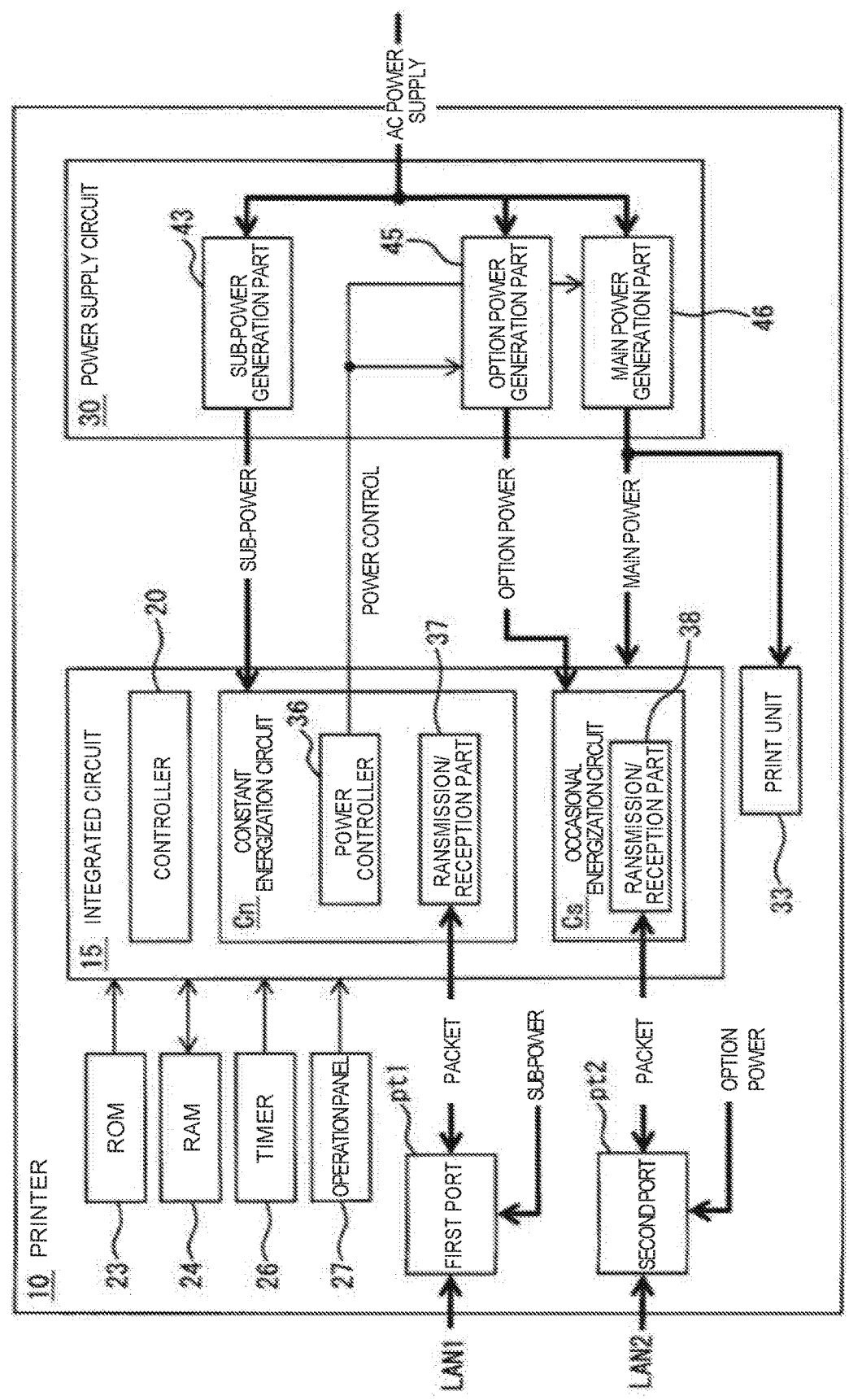
FIG. 10 is a control block diagram illustrating a view of a printer according to a second embodiment.
Figure 11:
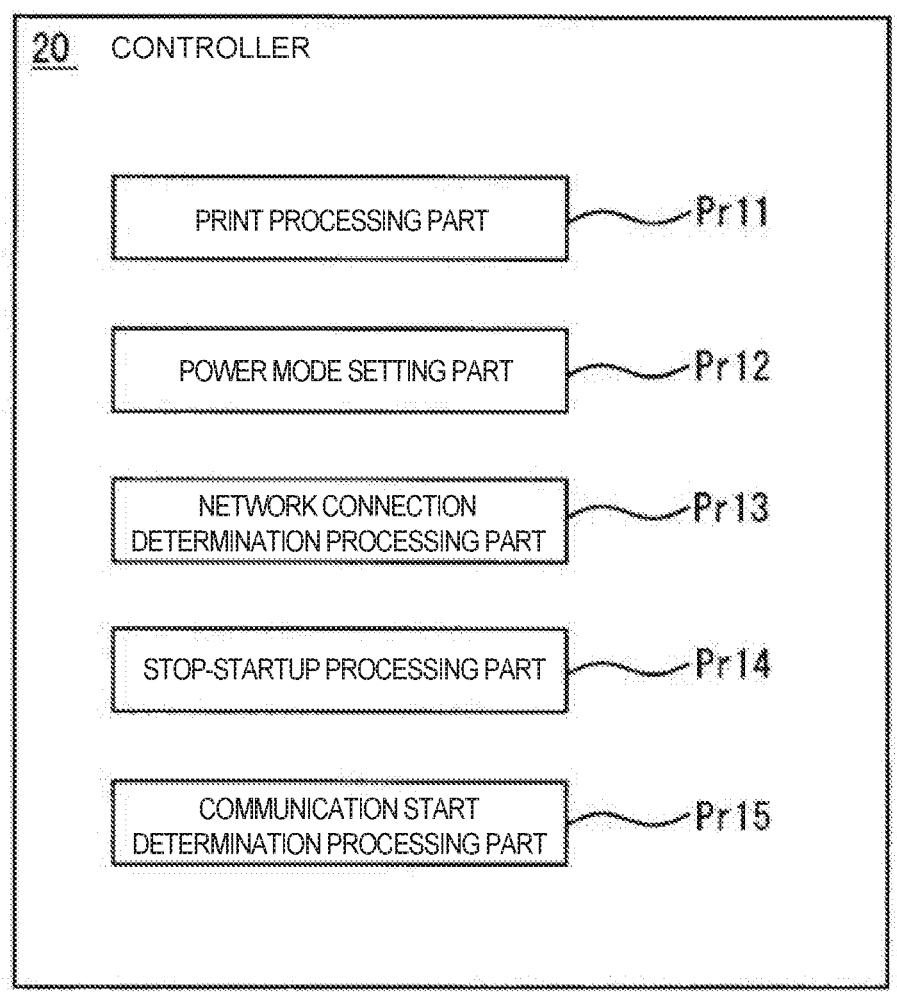
FIG. 11 is a control block diagram illustrating a view of a controller according to a second embodiment.

FIG. 10 is a control block diagram of the printer according to a second embodiment, and FIG. 11 is a control block diagram of a control portion according to a second embodiment.

In the figure, 10 represents the printer, and the printer 10 includes the first and second ports pt1 and pt2, an integrated circuit 15, a ROM 23 which serves as a first storage, a RAM 24 which serves as a second storage, a timer 26 which serves as a time measurement member, an operation panel 27, a power supply circuit 30, a print unit 33 and the like.

The integrated circuit 15 includes the controller 20, a constant energization circuit Cn, an occasional energization circuit Cs and the like, the constant energization circuit Cn includes a power controller 36 and a transmission/reception part 37 which serves a first communication part and the occasional energization circuit Cs includes a transmission/reception part 38 which serves a second communication part.

The controller 20 includes a print processing part Pr11 serving as a print processor, a power mode setting part Pr12 serving as a power mode setting processor, a network connection determination processing part Pr13 serving as a network connection determination processor, a stop-startup processing part Pr14 serving as a stop-startup processor, a communication start determination processing part Pr15 serving as a communication start determination processor, and the like.

The print processing part Pr11 performs image processing on a print job which is received from a host computer serving as a high level device and drives the print unit 33 so as to perform printing.

The power mode setting part Pr12 sets, as a power mode, in the printer 10, a normal mode which is a first mode or a power saving mode in which power consumption is lower than in the normal mode and which is a second mode. When a printing operation is not performed for a predetermined time, the power mode setting part Pr12 sets the power saving mode in the printer 10 and turns off main power which is described later.

The network connection determination processing part Pr13 determines whether or not the first and second ports pt1 and pt2 are connected on the same network Nw.

The stop-startup processing part Pr14 determines whether or not stop conditions are satisfied, and when the stop conditions are satisfied, the stop-startup processing part Pr14 stops any one of the first and second ports pt1 and pt2, for example, stops the second port pt2, and then determines whether or not the startup conditions are satisfied, and when the startup conditions are satisfied, the stop-startup processing part Pr14 restarts the second port pt2.

The communication start determination processing part Pr15 determines whether or not the personal computer Pc12 starts to communicate with one of the first and second ports pt1 and pt2, for example, the second port pt2.

The power supply circuit 30 includes a sub-power generation part 43, an option power generation part 45 and a main power generation part 46, and the sub-power generation part 43, the option power generation part 45 and the main power generation part 46 are individually connected to an AC power supply serving as a commercial power supply so as to receive and convert alternating-current power into direct-current power.

The sub-power generation part 43 generates sub-power and supplies the sub-power to the constant energization circuit Cn while the power of the printer 10 is turned on.

The option power generation part 45 is controlled by the power controller 36 of the controller 20, and supplies option power to the occasional energization circuit Cs while the second port pt2 is started up.

The main power generation part 46 is controlled by the power controller 36 of the controller 20, and stops the supply of the main power to the integrated circuit 15 and the print unit 33 while the printer 10 is set in the power saving mode.

The print unit 33 includes a printer engine such as a paper feed mechanism, an image formation unit, a transfer unit and a fixing unit which are not illustrated.

The power controller 36 performs power control so as to turn on and off the option power generation part 45 and the main power generation part 46 and to selectively generate the option power and the main power.

The transmission/reception parts 37 and 38 respectively transmit packets to the first and second ports pt1 and pt2 and receive packets from the first and second ports pt1 and pt2.

A relationship between the power mode set in the printer 10 and the connection states of the first and second ports pt1 and pt2 is then described.

Figure 12:
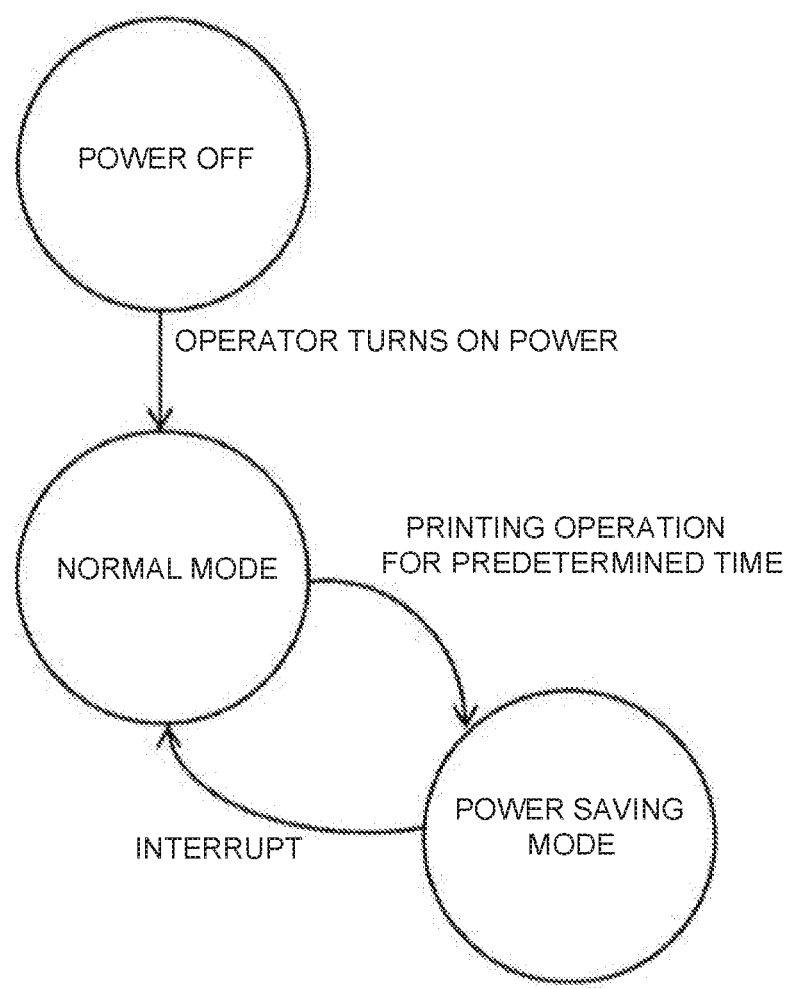
FIG. 12 is a transition diagram illustrating a view of a power mode according to a second embodiment.
Figure 13:
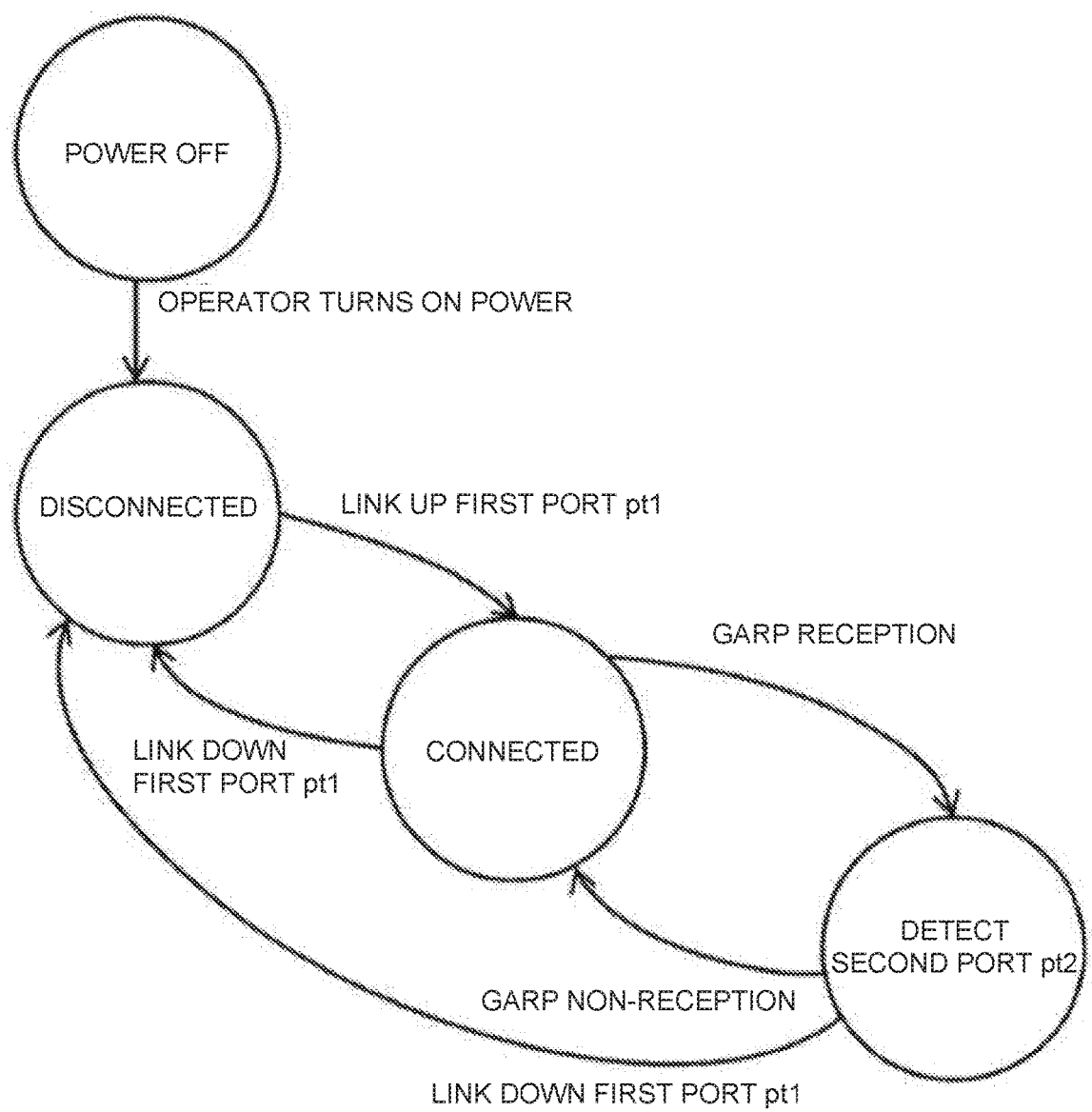
FIG. 13 is a transition diagram of the connection state of a first port according to a second embodiment.
Figure 14:
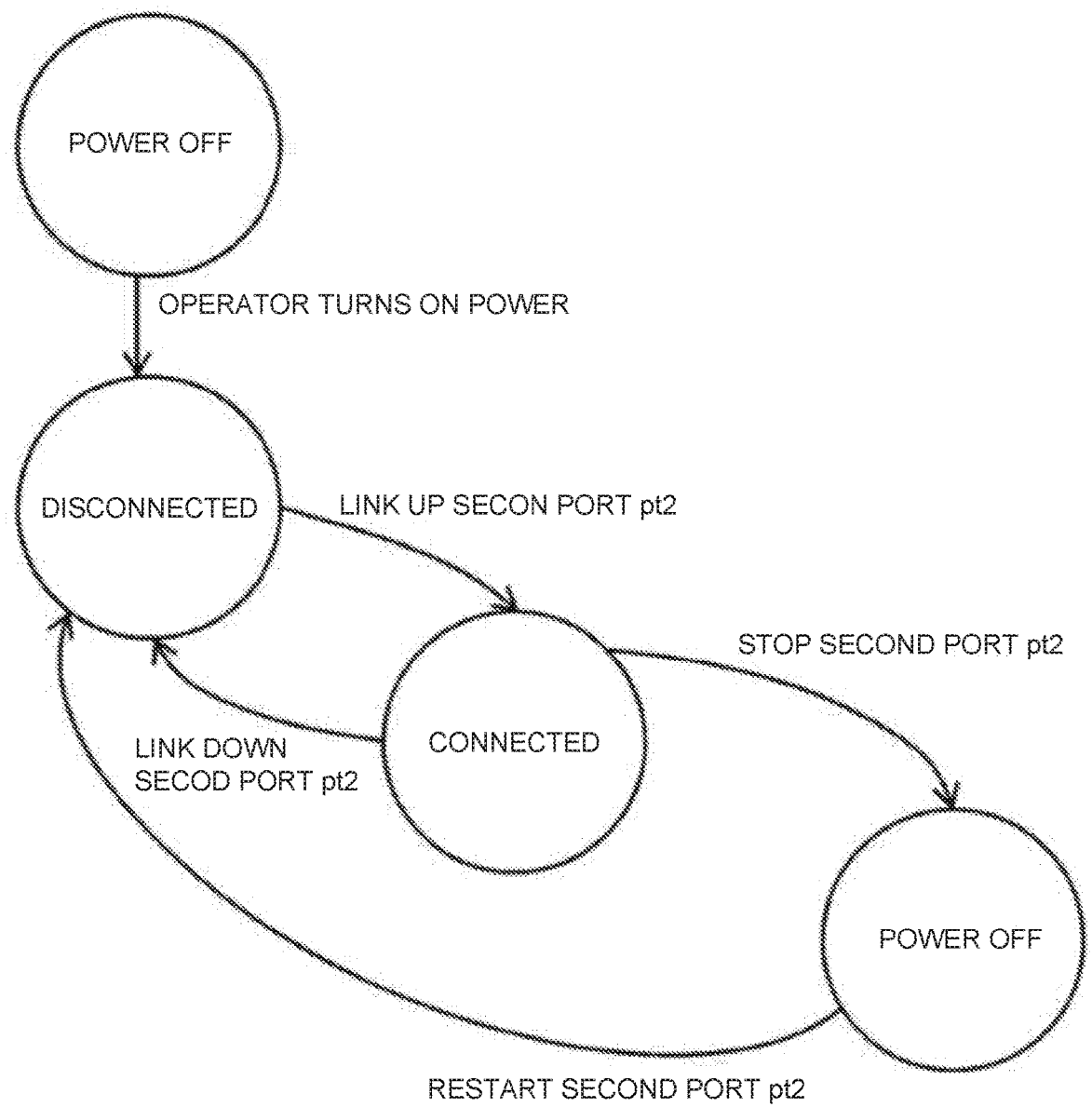
FIG. 14 is a transition diagram of the connection state of a second port according to a second embodiment.

FIG. 12 is a transition diagram of the power mode according to a second embodiment, FIG. 13 is a transition diagram of the connection state of the first port according to a second embodiment and FIG. 14 is a transition diagram of the connection state of the second port according to a second embodiment.

When the operator turns on the power of the printer 10 (FIG. 10), the normal mode is set in the printer 10, and when the printing operation is not performed for a predetermined time in the normal mode, the power saving mode is set in the printer 10. Then, when in the power saving mode, the operator operates the operation part 27 so as to start printing, the normal mode is set in the printer 10 by an interrupt.

When the operator turns on the power, the sub-power is supplied to the first port pt1 so as to start up the first port pt1. The first port pt1 is in a "disconnected" state immediately after the sub-power is supplied, and when the first port pt1 establishes a link to an opposite device, for example, the hub Hb11 (FIG. 8), so as to link up, the first port pt1 is changed to a "connected" state.

When in the "connected" state, the first port pt1 receives a specific packet transmitted by the second port pt2, that is, a Gratuitous ARP (hereinafter referred to as the "GARP") in this case which is a test packet and which is described later, the first port pt1 detects the second port pt2, and thus the first and second ports pt1 and pt2 are changed to a state where the first and second ports pt1 and pt2 are connected on the network Nw, that is, a state of "detection of the second port pt2". The GARP is one of ARPs which are specific packets, and is used for determining whether or not the same IP address as the IP address set in the first port pt1 itself is set in another node.

When in the "connected" state, the first port pt1 loses the link to the hub Hb11 so as to link down, the first port pt1 is returned to the "disconnected" state.

Then, when in the state of "detection of the second port pt2", the first port pt1 does not receive the GARP which is periodically transmitted by the second port pt2, the first port pt1 is returned to the "connected" state. Furthermore, when in the state of "detection of the second port pt2", the first port pt1 loses the link to the hub Hb11 so as to link down, the first port pt1 is returned to the "disconnected" state.

When the operator turns on the power, the option power is supplied to the second port pt2 so as to start up the second port pt2. The second port pt2 is in the "disconnected" state immediately after the option power is supplied, and when the second port pt2 establishes a link to an opposite device, for example, the hub Hb12, so as to link up, the second port pt2 is changed to the "connected" state.

In the "connected" state, the second port pt2 periodically receives the GARP. When in the "connected" state, the power saving mode is set in the printer 10 by a timer interrupt which is described later, in the option power generation part 45, the option power is turned off, the option power is not supplied to the second port pt2 and the second port pt2 is stopped, with the result that the second port pt2 is changed to a "power-off" state.

Furthermore, when in the "connected" state, the second port pt2 loses the link to the hub Hb12 so as to link down, the second port pt2 is returned to the "disconnected" state.

When in the "power-off" state, the supply of the option power is restarted by the timer interrupt, in the option power generation part 45, the option power is turned on, the option power is supplied to the second port pt2 and thus the second port pt2 is restarted, with the result that the second port pt2 is returned to the "disconnected" state.

An operation of the printer 10 when the timer interrupt occurs in a state where the normal mode is set in the printer 10 is then described.

Figure 15:
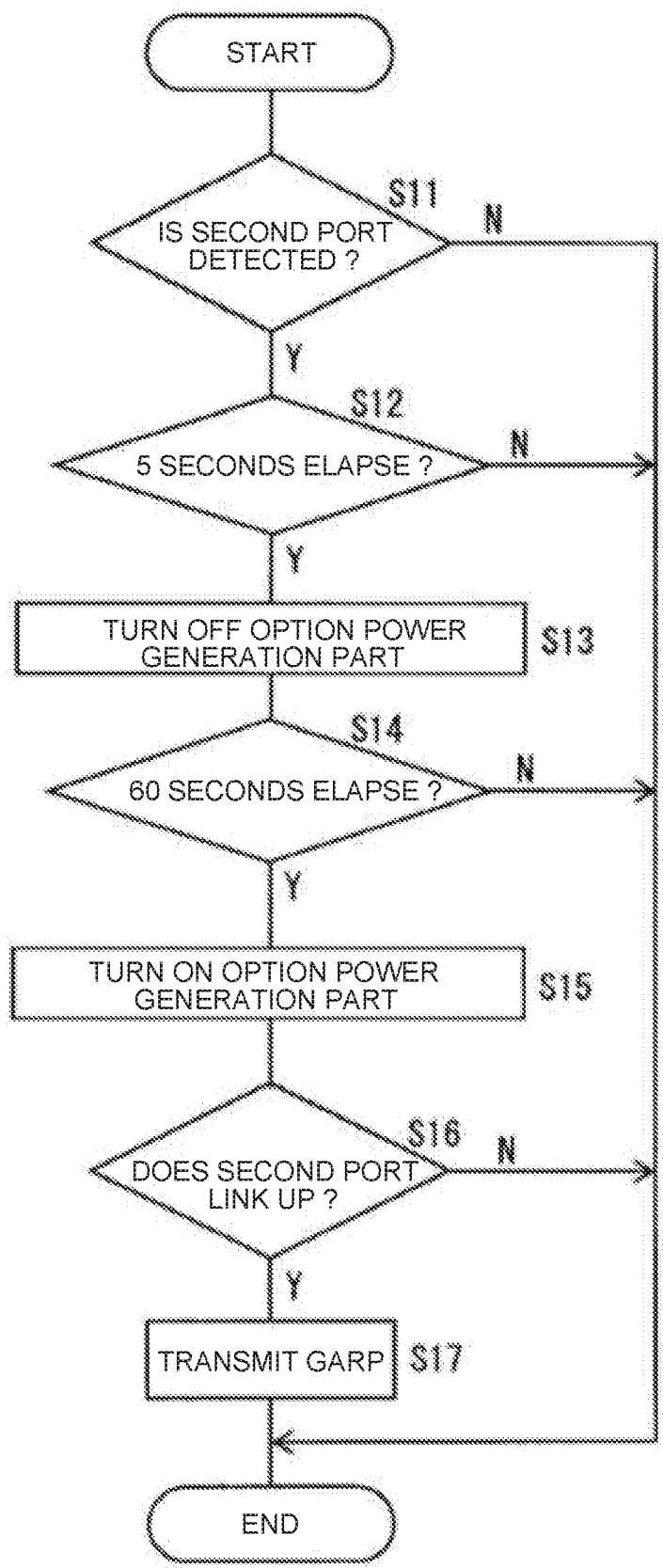
FIG. 15 is a diagram illustrating a flowchart of an operation of the printer when a timer interrupt occurs according to a second embodiment.
Figure 16:
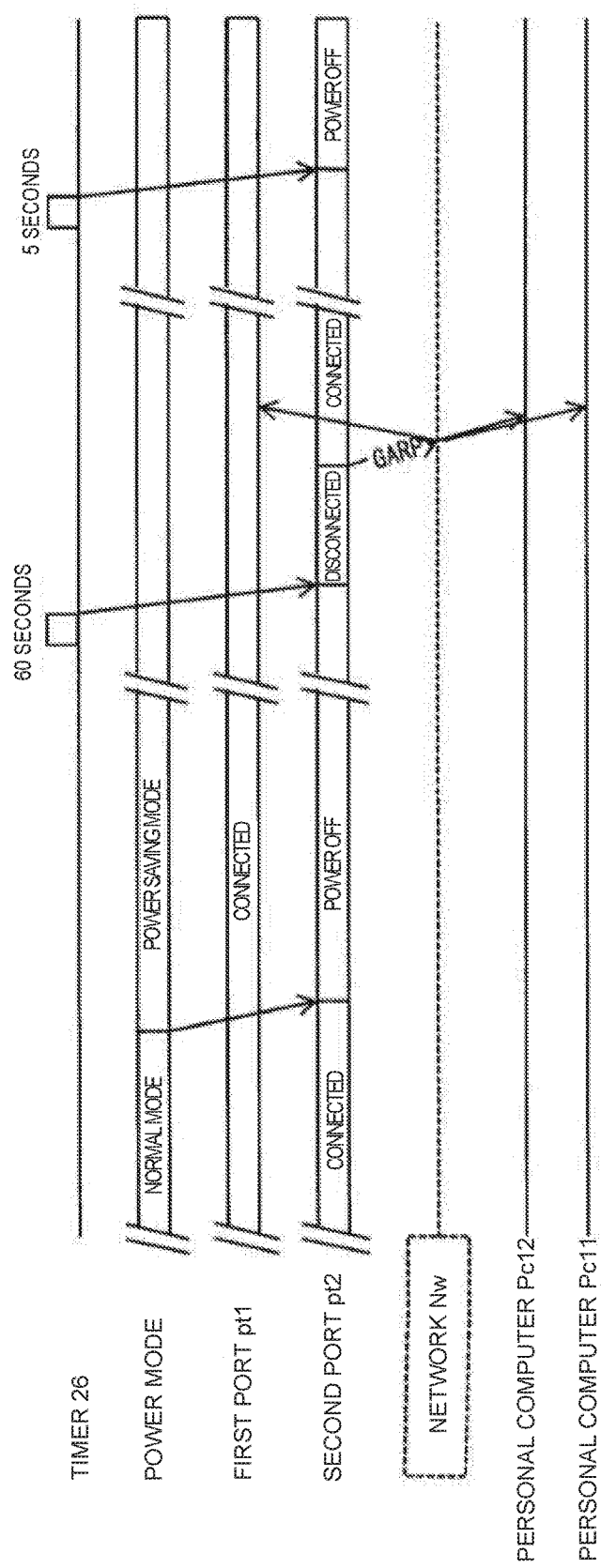
FIG. 16 is a diagram illustrating a time chart of the operation of the printer when the timer interrupt occurs according to a second embodiment.

FIG. 15 is a flowchart illustrating the operation of the printer when the timer interrupt occurs according to a second embodiment, and FIG. 16 is a time chart illustrating the operation of the printer when the timer interrupt occurs according to a second embodiment.

In a case where the printer 10 and the individual personal computers Pci' are connected on the same network Nw as illustrated in FIG. 8, when the operator operates the operation panel 27 (FIG. 10) so as to turn on the power, the power mode setting part Pr12 sets the normal mode in the printer 10.

The stop-startup processing part Pr14 supplies the sub-power to the first port pt1 and supplies the option power to the second port pt2. In this way, the first and second ports pt1 and pt2 are brought into the "connected" state.

Then, when in the "connected" state, the first port pt1 receives the GARP from the second port pt2, the network connection determination processing part Pr13 detects the second port pt2, and thus the first port pt1 is changed to the state of "detection of the second port pt2". In this way, the network connection determination processing part Pr13 determines that the first and second ports pt1 and pt2 are connected on the same network Nw.

Then, the stop-startup processing part Pr14 determines whether or not the stop conditions are satisfied by the timer interrupt after the first port pt1 is changed to the state of "detection of the second port pt2" by whether or not a predetermined time, for example, 5 [seconds], elapse while the printing operation is not operated in the printer 10.

Then, when 5 [seconds] elapse after the stop conditions are satisfied, the power mode setting part Pr12 sets the power saving mode in the printer 10, and the stop-startup processing part Pr14 turns off the option power generation part 45 with the power controller 36 so as to stop the supply of the option power. Accordingly, the second port pt2 is stopped so as to be brought into the "power-off" state.

Then, the stop-startup processing part Pr14 determines whether or not the startup conditions are satisfied by the timer interrupt by whether or not a predetermined time, for example, 60 [seconds], elapse after the second port pt2 is stopped.

Then, when 60 [seconds] elapse after the startup conditions are satisfied, the stop-startup processing part Pr14 turns on the option power generation part 45 with the power controller 36 so as to supply the option power. The stop-startup processing part Pr14 also determines whether or not the second port pt2 is restarted so as to link up until a predetermined time, that is, 2 [seconds] in the present embodiment elapse after the option power is supplied.

Although here, the second port pt2 is connected to the hub Hb12 and thereby establishes the link to the hub Hb12 so as to link up and to be brought into the "connected" state, when the second port pt2 does not link up for any reason such as the disconnection of a cable, the stop-startup processing part Pr14 completes the processing.

Then, the network connection determination processing part Pr13 transmits (transmits broadcast) the GARP from the second port pt2 to the individual personal computers Pci' which are all the nodes within the network Nw. The first port pt1 receives the GARP so as to maintain the state of "detection of the second port pt2".

When the second port pt2 is started up so as to be brought into the "disconnected" state, the stop-startup processing part Pr14 determines whether or not the stop conditions are satisfied again by the timer interrupt by whether or not 5 [seconds] elapse while the printing operation is not performed in the printer 10.

Then, when 5 [seconds] elapse after the stop conditions are satisfied, the power mode setting part Pr12 sets the power saving mode in the printer 10, and the stop-startup processing part Pr14 turns off the option power generation part 45 with the power controller 36 so as to stop the supply of the option power. Accordingly, the second port pt2 is stopped again so as to be brought into the "power-off" state.

Then, the stop-startup processing part Pr14 determines whether or not the startup conditions are satisfied again by the timer interrupt by whether or not 60 [seconds] elapse after the second port pt2 is stopped.

The flowchart is then described.

In step S11, the network connection determination processing part Pr13 determines whether or not the second port pt2 is detected. When the second port pt2 is detected, the processing proceeds to step S12 whereas when the second port pt2 is not detected, the processing is completed.

In step S12, the stop-startup processing part Pr14 determines whether or not 5 [seconds] elapse. When 5 [seconds] elapse, the processing proceeds to step S13 whereas when 5 [seconds] do not elapse, the processing is completed.

In step S13, the stop-startup processing part Pr14 turns off the option power generation part 45.

In step S14, the stop-startup processing part Pr14 determines whether or not 60 [seconds] elapse. When 60 [seconds] elapse, the processing proceeds to step S15 whereas when 60 [seconds] do not elapse, the processing is completed.

In step S15, the stop-startup processing part Pr14 turns on the option power generation part 45.

In step S16, the stop-startup processing part Pr14 determines whether or not the second port pt2 links up. When the second port pt2 links up, the processing proceeds to step S17 whereas when the second port pt2 do not link up, the processing is completed.

In step S17, the network connection determination processing part Pr13 transmits the GARP to the individual personal computers Pci' and completes the processing.

An operation of the printer 10 when the first port pt1 receives the ARP in a state where the power saving mode is set is then described.

Figure 17:
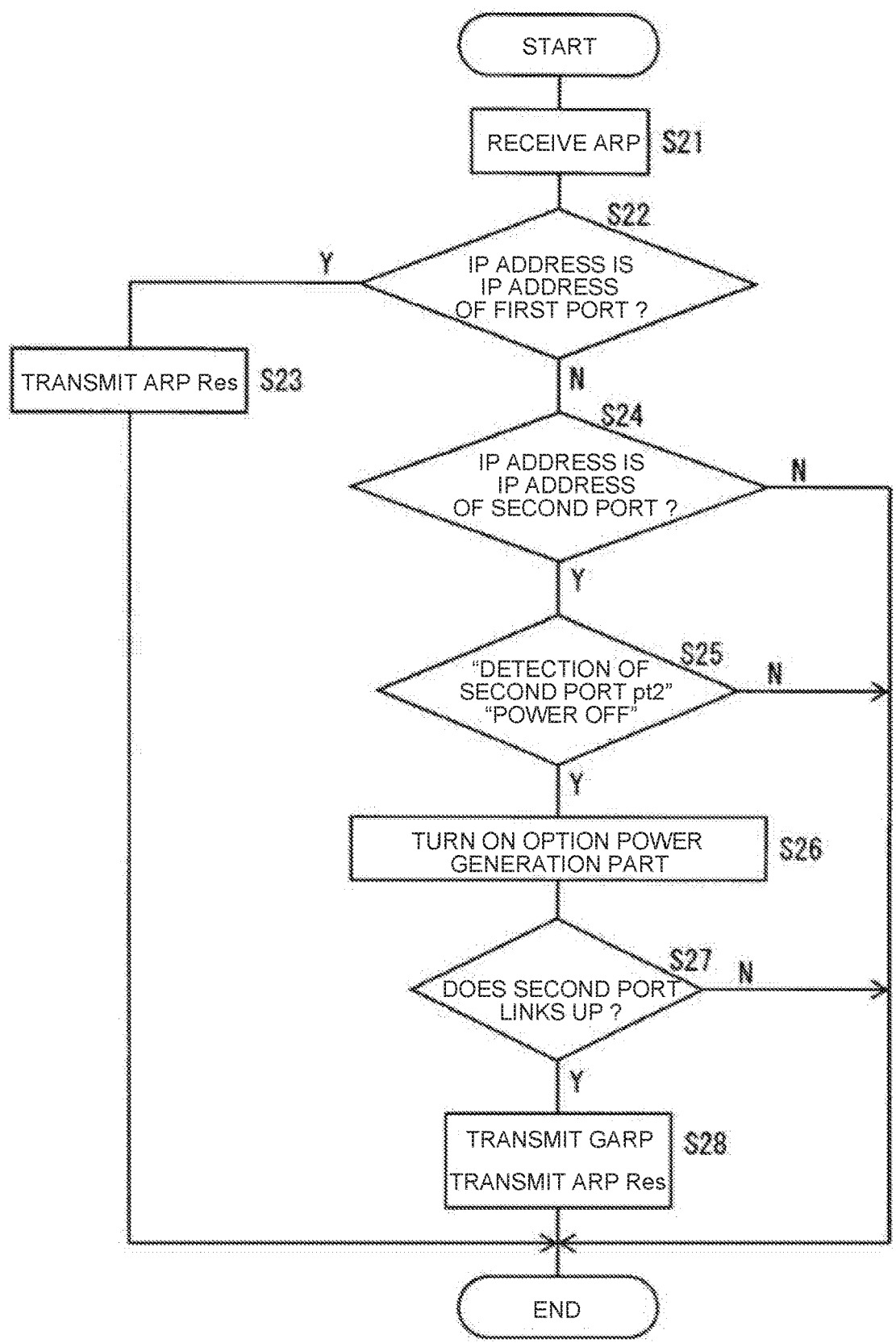
FIG. 17 is a diagram illustrating a flowchart of an operation of the printer when the first port receives an ARP in a state where a power saving mode is set according to a second embodiment.
Figure 18:
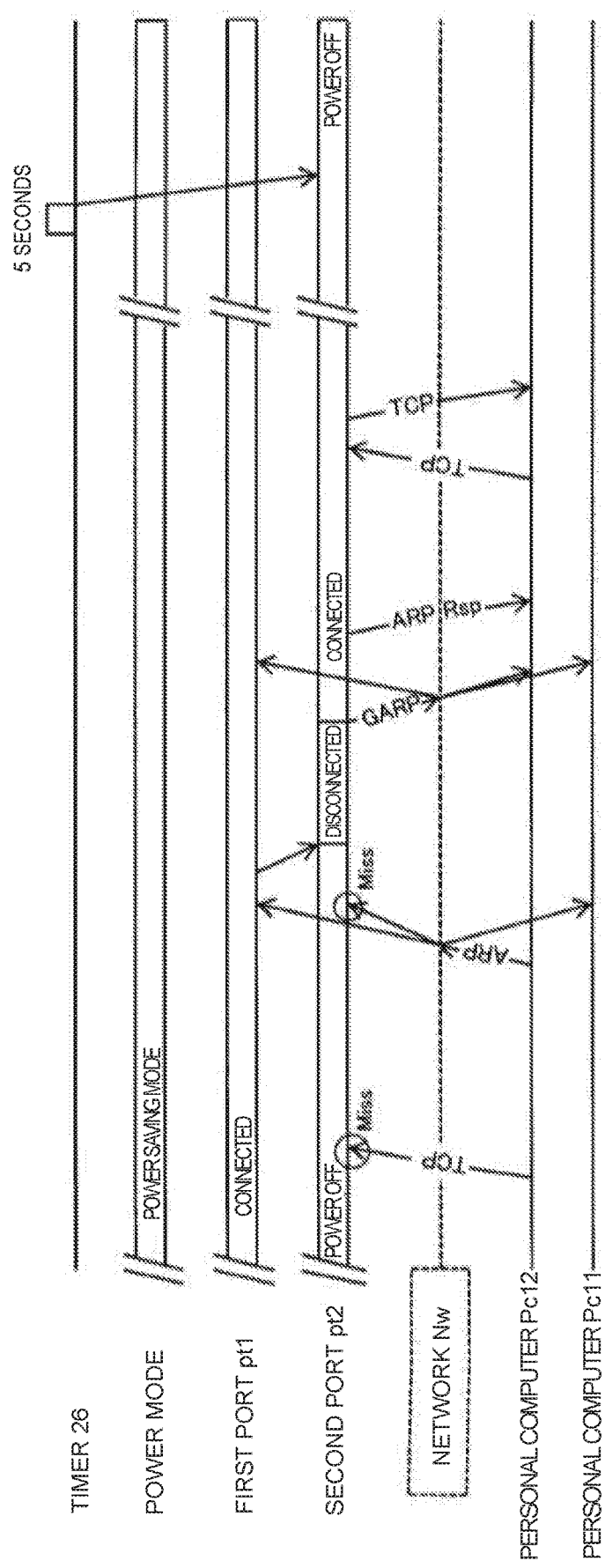
FIG. 18 is a diagram illustrating a time chart of the operation of the printer when the first port receives the ARP in the state where the power saving mode is set according to a second embodiment.

FIG. 17 is a flowchart illustrating the operation of the printer when the first port receives the ARP in the state where the power saving mode is set according to a second embodiment, and FIG. 18 is a time chart illustrating the operation of the printer when the first port receives the ARP in the state where the power saving mode is set according to a second embodiment.

In a case where it is necessary to transmit a print job, various types of data and the like when the power saving mode is set in the printer 10, the personal computer Pc12 starts data communication with the printer 10. As described previously, in the personal computer Pc12, the IP address of the printer 10 registered by the operator in the ARP table is 192.168.1.21 which is the IP address of the second port pt2, and thus when the data communication is started, the personal computer Pc12 transmits a TCP (Transmission Control Protocol) which is a packet for the second port pt2. However, the option power is not supplied to the second port pt2, and thus the second port pt2 is in the "power-off" state, with the result that the second port pt2 cannot receive the TCP (Miss).

When the personal computer Pc12 does not receive a response to the TCP, the personal computer Pc12 erases the MAC address registered in the ARP table together with the IP address 192.168.1.21, and searches for the MAC address corresponding to the IP address 192.168.1.21 again. Hence, the personal computer Pc12 transmits (transmits broadcast) the ARP to the printer 10 and the personal computers Pci' which are all the nodes within the network Nw.

Here, the second port pt2 is also in the "power-off" state such that the second port pt2 cannot receive the TCP (Miss). On the other hand, when the first port pt1 receives the ARP, the communication start determination processing part Pr15 determines whether or not the personal computer Pc12 starts to communicate with the second port pt2 by whether or not the IP address for which the ARP is used to search is the IP address 192.168.1.11 of the first port pt1.

When the IP address for which the ARP is used to search is the IP address 192.168.1.11 of the first port pt1, the communication start determination processing part Pr15 determines that the personal computer Pc12 starts to communicate with the second port pt2 so as to transmit, with the ARP Res, the MAC address aa:bb:cc:dd:ee:11 of the first port pt1 to the entire network Nw.

When the IP address for which the ARP is used to search is not the IP address 192.168.1.11 of the first port pt1, the communication start determination processing part Pr15 determines whether or not the IP address for which the ARP is used to search is the IP address 192.168.1.21 of the second port pt2.

When the IP address for which the ARP is used to search is the IP address 192.168.1.21 of the second port pt2, the stop-startup processing part Pr14 determines whether or not the first port pt1 is in the state of "detection of the second port pt2" and the second port pt2 is in the "power-off" state.

When the first port pt1 is in the state of "detection of the second port pt2" and the second port pt2 is in the "power-off" state, the stop-startup processing part Pr14 turns on the option power generation part 45 with the power controller 36 so as to supply the option power to the second port pt2, with the result that the second port pt2 is started up so as to be brought into the "disconnected" state.

Then, the stop-startup processing part Pr14 determines whether or not the second port pt2 is started up so as to link up until 2 [seconds] elapse after the option power generation part 45 is turned on.

Although here, the second port pt2 is connected to the hub Hb12 and thereby establishes the link to the hub Hb12 so as to link up and to be brought into the "connected" state, when the second port pt2 does not link up for any reason such as the disconnection of a cable, the stop-startup processing part Pr14 completes the processing.

Then, when the second port pt2 is brought into the "connected" state, the second port pt2 transmits the GARP to the individual personal computers Pci' which are all the nodes within the network Nw. The first port pt1 receives the GARP so as to maintain the state of "detection of the second port pt2".

Since in the first port pt1, the ARP is received from the personal computer Pc12 when the second port pt2 is in the "power-off" state, the second port pt2 transmits the ARP Res to the personal computer Pc12.

When the personal computer Pc12 receives the ARP Res transmitted from the second port pt2, the personal computer Pc12 registers, in the ARP table, 192.168.1.21 as the IP address of the second port pt2 of the printer 10 and aa:bb:cc:dd:ee:21 as the MAC address, and restarts the data communication.

In other words, when the personal computer Pc12 transmits the TCP to the second port pt2 again, since the personal computer Pc12 is in the "connected" state so as to be able to receive the TCP, the TCP is transmitted to the personal computer Pc12.

When the data communication is performed between the personal computer Pc12 and the printer 10 in this way, and the data communication is completed, the stop-startup processing part Pr14 determines whether or not the stop conditions are satisfied again by the timer interrupt by whether or not 5 [seconds] elapse while the printing operation is not performed in the printer 10.

Then, when 5 [seconds] elapse after the stop conditions are satisfied, the power mode setting part Pr12 sets the power saving mode in the printer 10, and the stop-startup processing part Pr14 turns off the option power generation part 45 with the power controller 36. Accordingly, the second port pt2 is stopped again so as to be brought into the "power-off" state.

The flowchart is then described.

In step S21, the first port pt1 receives the ARP.

In step S22, the communication start determination processing part Pr15 determines whether or not the IP address for which to search is the IP address of the first port pt1. When the IP address for which to search is the IP address of the first port pt1, the processing proceeds to step S23 whereas when the IP address for which to search is not the IP address of the first port pt1, the processing proceeds to step S24.

In step S23, the communication start determination processing part Pr15 transmits the ARP Res to the entire network Nw and completes the processing.

In step S24, the communication start determination processing part Pr15 determines whether or not the IP address for which to search is the IP address of the second port pt2. When the IP address for which to search is the IP address of the second port pt2, the processing proceeds to step S25 whereas when the IP address for which to search is not the IP address of the second port pt2, the processing is completed.

In step S25, the stop-startup processing part Pr14 determines whether or not the first port pt1 is in the state of "detection of the second port pt2" and the second port pt2 is in the "power-off" state. When the first port pt1 is in the state of "detection of the second port pt2" and the second port pt2 is in the "power-off" state, the processing proceeds to step S26 whereas when the first port pt1 is not in the state of "detection of the second port pt2" and the second port pt2 is not in the "power-off" state, the processing is completed.

In step S26, the stop-startup processing part Pr14 turns on the option power generation part 45.

In step S27, the stop-startup processing part Pr14 determines whether or not the second port pt2 links up. When the second port pt2 links up, the processing proceeds to step S28 whereas when the second port pt2 does not link up, the processing is completed.

In step S28, the second port pt2 transmits the GARP to the individual personal computers Pci', transmits the ARP Res to the personal computer Pc12 and completes the processing.

An example of the TCP transmitted from the personal computer Pc12 to the second port pt2 of the printer 10 is then described.

Figure 19:
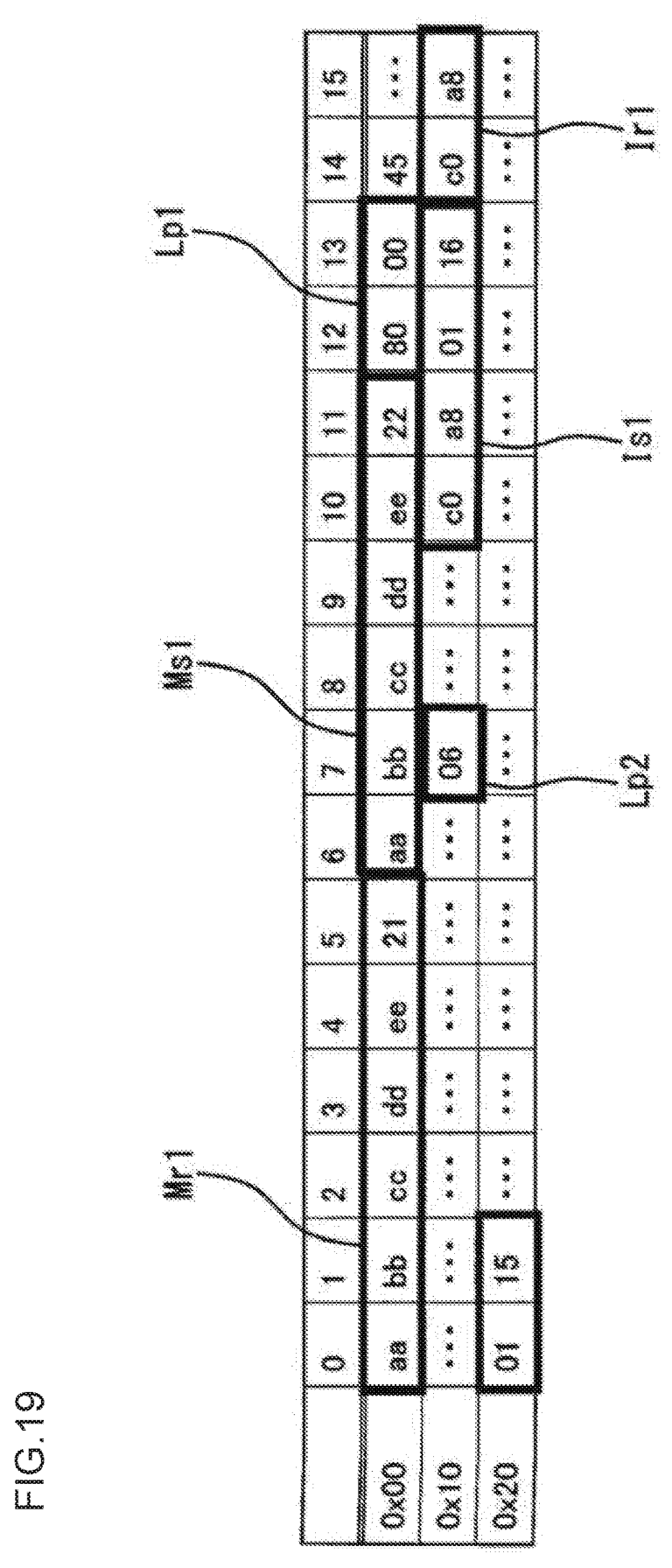

FIG. 19 is a diagram illustrating an example of the TCP which is transmitted from the personal computer to the second port of the printer according to a second embodiment.

<Ethernet (Registered Trademark) Information>

Transmission destination MAC address Mr 1: aa:bb:cc:dd:ee:21

Transmission source MAC address Ms 1: aa:bb:cc:dd:ee:22

Layer 2 protocol Lp 1: 0x8000 (IP)

<IP Information>

Layer 3 protocol Lp 2: 0x06 (TCP)

Transmission destination IP address Ir 1: 192.168.1.21

Transmission source IP address Is 1: 192.168.1.22

The TCP is a packet which is transmitted when data is sent from the personal computer Pc12 to the second port pt2 of the printer 10. In this case, since in the personal computer Pc12, the MAC address aa:bb:cc:dd:ee:21 of the second port pt2 of the printer 10 is registered in the ARP table, the TCP is transmitted to the MAC address aa:bb:cc:dd:ee:21 of the second port pt2.

An example of the TCP transmitted from the second port pt2 of the printer 10 to the personal computer Pc12 is then described.

Figure 20:
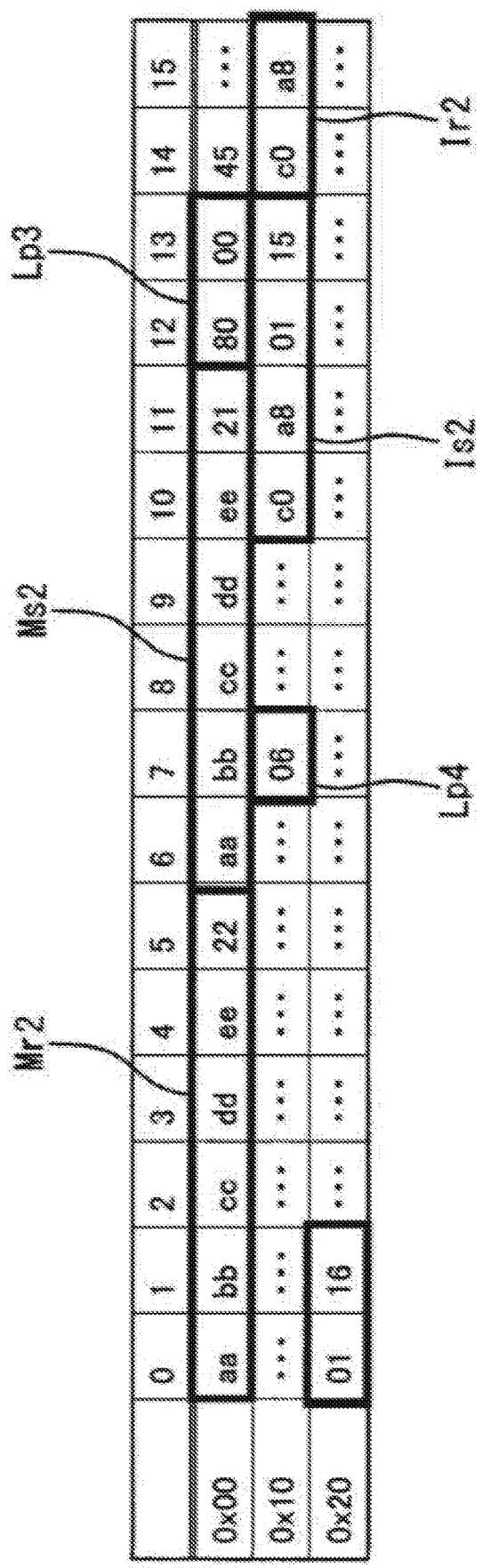
FIG. 20 is a diagram illustrating a view of an example of a TCP which is transmitted from the second port of the printer to the personal computer according to a second embodiment.

FIG. 20 is a diagram illustrating an example of the TCP which is transmitted from the second port of the printer to the personal computer according to a second embodiment.

<Ethernet (Registered Trademark) Information>
Transmission destination MAC address Mr 2: aa:bb:cc:dd:ee:22
Transmission source MAC address Ms 2: aa:bb:cc:dd:ee:21
Layer 2 protocol Lp 3: 0x8000 (IP)
<IP Information>
Layer 3 protocol Lp 4: 0x06 (TCP)
Transmission destination IP address Ir 2: 192.168.1.22
Transmission source IP address Is 2: 192.168.1.21

The TCP is a packet which is transmitted when data is sent from the second port pt2 of the printer 10 to the personal computer Pc12. In this case, since in the second port pt2 of the printer 10, the MAC address aa:bb:cc:dd:ee:22 of the personal computer Pc12 is registered in the ARP table, the TCP is transmitted to the MAC address aa:bb:cc:dd:ee:22 of the personal computer Pc12.

An example of the ARP for searching the second port pt2 of the printer 10 in the personal computer Pc12 is then described.

FIG. 21 is a diagram illustrating an example of the ARP for searching the second port of the printer in the personal computer according to a second embodiment.
<Ethernet (Registered Trademark) Information>
Transmission destination MAC address Mr 3: ff:ff:ff:ff:ff:ff
Transmission source MAC address Ms 3: aa:bb:cc:dd:ee:22
Layer 2 protocol Lp 5: 0x0806 (ARP)
<ARP Information>
ARP operation ε1: 0x0001 (search)
Search destination IP address Iu1: 192.168.1.21
Search destination MAC address: 00:00:00:00:00:00 (blank because it is unclear)
Search source IP address: 192.168.1.22
Search source MAC address: aa:bb:cc:dd:ee:22

The ARP is a packet which is transmitted from the personal computer Pc12 when the MAC address of the second port pt2 of the printer 10 is searched for by broadcast transmission. In this case, since the IP address 192.168.1.22 of the second port pt2 of the printer 10 is registered in the ARP table but the MAC address is not registered therein, as the search destination IP address Iu1, the IP address 192.168.1.21 of the second port pt2 is transmitted broadcast to the network Nw.

An example of the ARP Res transmitted from the second port pt2 of the printer 10 to the personal computer Pc12 is then described.

FIG. 22 is a diagram illustrating an example of the ARP Res which is transmitted from the second port of the printer to the personal computer according to a second embodiment.
<Ethernet (Registered Trademark) Information>
Transmission destination MAC address Mr 4: aa:bb:cc:dd:ee:22
Transmission source MAC address Ms 4: aa:bb:cc:dd:ee:21
Layer 2 protocol Lp 6: 0x0806 (ARP Res)
<ARP Information>
ARP operation ε2: 0x0002 (response)
Response destination IP address Iw1: 192.168.1.22
Response destination MAC address: aa:bb:cc:dd:ee:22
Response source IP address: 192.168.1.21
Response source MAC address Mw1: aa:bb:cc:dd:ee:21

The ARP Res is a packet transmitted when the ARP is transmitted from the personal computer Pc12 in order to search for the MAC address of the second port pt2 of the printer 10 by broadcast transmission and then the second port pt2 of the printer 10 responses thereto. In this case, when the personal computer Pc12 transmits the ARP, the second port pt2 transmits the MAC address aa:bb:cc:dd:ee:21 of the second port pt2 for the MAC address aa:bb:cc:dd:ee:22 of the personal computer Pc12 included in the ARP.

An example of the GARP transmitted broadcast from the second port pt2 of the printer 10 to the network Nw is then described.

FIG. 23 is a diagram illustrating an example of the GARP which is transmitted broadcast from the second port of the printer to a network according to a second embodiment.
<Ethernet (Registered Trademark) Information>
Transmission destination MAC address Mr 5: ff:ff:ff:ff:ff:ff (broadcast)
Transmission source MAC address Ms 5: aa:bb:cc:dd:ee:21
Layer 2 protocol Lp 7: 0x0806 (ARP)
<ARP Information>
ARP operation ε3: 0x0001 (search)
Search destination IP address Iu2: 192.168.1.21
Search destination MAC address Mu2: aa:bb:cc:dd:ee:21
Search source IP address: 192.168.1.21
Search source MAC address: aa:bb:cc:dd:ee:21

The GARP is a packet which is transmitted in order to search the second port pt2 itself by broadcast transmission. In this case, in order for the MAC address aa:bb:cc:dd:ee:21 and the IP address 192.168.1.21 of the second port pt2 itself of the printer 10 to be notified to the personal computers Pci' which are the individual nodes of the network Nw, the MAC address aa:bb:cc:dd:ee:21 and the IP address 192.168.1.21 are transmitted from the second port pt2 to the network Nw.

As described above, in a second embodiment described above, when it is determined that the first and second ports pt1 and pt2 are connected on the same network Nw, the second port pt2 is stopped whereas when it is determined that the personal computer Pc12 starts to communicate with the second port pt2, the second port pt2 is restarted, with the result that the personal computer Pc12 can reliably access the printer 10.

When the power saving mode is set in the printer 10, the second port pt2 is stopped whereas when the personal computer Pc12 starts to communicate with the second port pt2, the second port pt2 is restarted, with the result that it is possible to reduce the amount of consumption of power of the printer 10.

Then, when the first port pt1 is started up so as to receive the ARP transmitted from the personal computer Pc12 while the second port pt2 is stopped in the printer 10, the supply of the option power to the second port pt2 is restarted, and thus the ARP Res is transmitted to the personal computer Pc12, with the result that the personal computer Pc12 can reliably access the printer 10.

Data communication which is performed between the printer 10 and the personal computers Pci' when the network is separated into the networks Nw1 and Nw2 as illustrated in FIG. 9 is then described.

Figure 24:
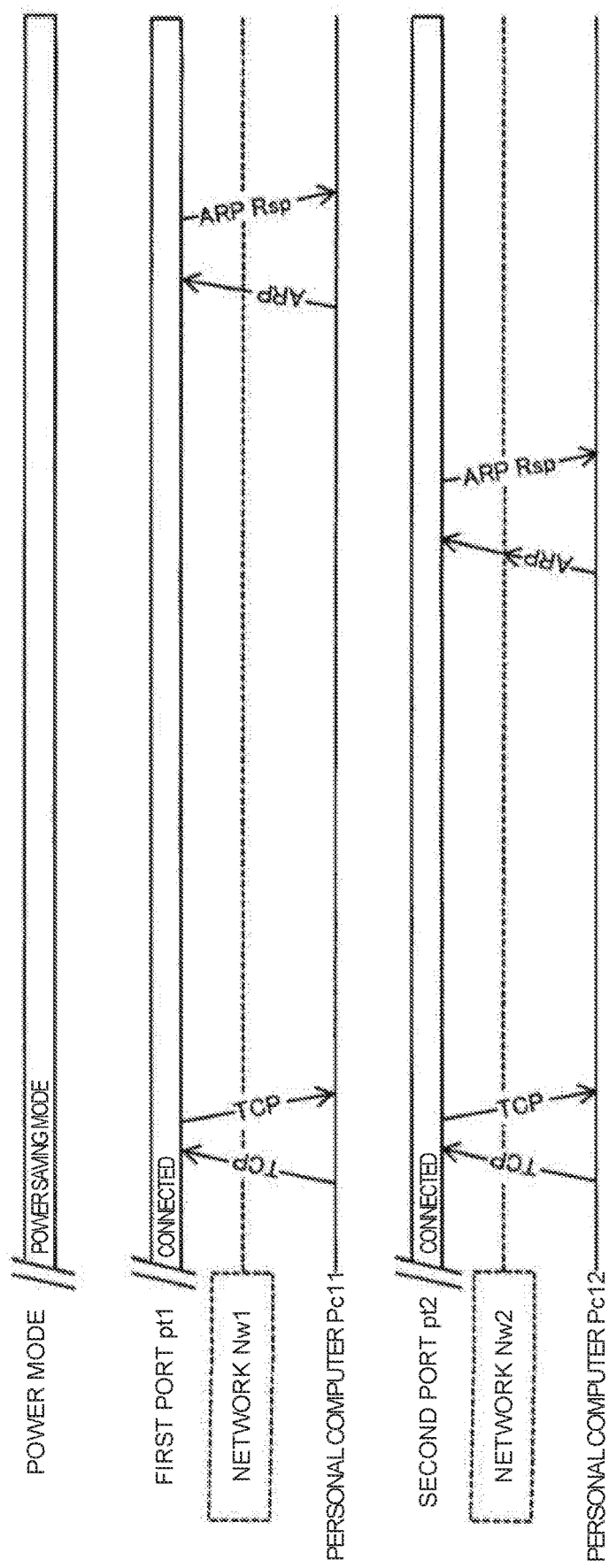
FIG. 24 is a diagram illustrating a reference view for illustrating data communication performed between the printer and the personal computer when the network is separated.

FIG. 24 is a reference view for illustrating the data communication performed between the printer and the personal computer when the network is separated.

In this case, since the network is separated into the networks Nw1 and Nw2, the TCP and the ARP are transmitted from the personal computer Pc11 to the first port pt1 of the printer 10, the TCP and the ARP Res are transmitted from the first port pt1 of the printer 10 to the personal computer Pc11, the TCP and the ARP are transmitted from the personal computer Pc12 to the second port pt2 of the printer 10 and the TCP and the ARP Res are transmitted from the second port pt2 of the printer 10 to the personal computer Pc12.

In a second embodiment described above, as the first and second ports pt1 and pt2 which are connected to the network Nw, the wired interfaces 12 are used. However, in a modification, as one or both of the first and second ports pt1 and pt2, the wireless interface 11 may be used.

In a second embodiment described above, whether or not the first and second ports pt1 and pt2 are connected on the same network Nw is determined, based on whether the GARP transmitted by the second port pt2 is received in the first port pt1. However, in a modification, Neighbor Advertisement of ICMPv6 may be used in order to determine whether or not the first and second ports pt1 and pt2 are connected on the same network. Furthermore, in a modification, whether or not the first and second ports pt1 and pt2 are connected on the same network Nw may be determined by transmitting and receiving unique packets between the first and second ports pt1 and pt2.

In a second embodiment described above, whether or not the personal computer Pc12 starts to communicate with the second port pt2 is determined by whether the ARP for searching the second port pt2 is received in the first port pt1. However, in a modification, whether or not the personal computer Pc12 starts to communicate with the second port pt2 may be determined, for example, by use of Neighbor Solicitation of ICMPv6 based on broadcast, a multicast packet and the like which need to be received in the second port pt2. Moreover, in a modification, whether or not the personal computer Pc12 starts to communicate with the second port pt2 may be determined based on broadcast, a multicast packet and the like which are unique and which are output from the printer driver of the personal computer Pc12.

In a second embodiment described above, the ARP for searching the second port pt2 is transmitted when in the personal computer Pc12, the MAC address of the second port pt2 is registered in the ARP table, the TCP is transmitted at the time when the personal computer Pc12 starts to communicate with the second port pt2 and the TCP cannot be received in the second port pt2. However, in a modification, the MAC address of the second port pt2 does not need to be registered in the ARP table of the personal computer Pc12. In such a case, when the personal computer Pc12 starts to communicate with the second port pt2, the ARP for searching the second port pt2 is transmitted.

In first and second embodiments described above, the networks which are compliant with the Ethernet (registered trademark) and the TCP/IP are used as the networks Nt and Nw. However, in a modification other networks may be used.

In first and second embodiments described above, the printer 10 is described as the information processing device. However, other information processing devices such as a copying machine, a facsimile and a multifunctional machine may be an information processing device to which one or more embodiments and modifications can be applied.

The invention includes other embodiments in addition to one or more embodiments and modifications above-described without departing from the spirit of the invention. One or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An information processing device connectable to a network and including interfaces in which network identification numbers can be set, the information processing device comprising:
   a network connection determination processor that determines whether or not first and second interfaces of the interfaces are connected on a same network;
   an identification number setting processor that sets, when it is determined that the first and second interfaces are connected on the same network, a first network identification number of one of the first and second interfaces, in addition to a second network identification number of the other of the first and second interfaces, for the other of the first and second interfaces; and
   a stop-startup processor that stops, when it is determined that the first and second interfaces are connected on the same network, the one of the first and second interfaces.

2. The information processing device according to claim 1, wherein
   the network connection determination processor determines, when both the first and second interfaces are started up, whether or not the first and second interfaces are connected on the same network.

3. The information processing device according to claim 1, wherein
   the network connection determination processor determines, each time a predetermined time elapses, whether or not the first and second interfaces are connected on the same network.

4. The information processing device according to claim 1, wherein
   the information processing device is connected to an external device on the network which is compliant with TCP/IP.

5. The information processing device according to claim 1, wherein
   the identification number setting processor, when it is determined that the first and second interfaces are connected on the same network, and the first network identification number of the one of the first and second interfaces, in addition to the second network identification number of the other of the first and second interfaces are set for the other of the first and second interfaces, deletes the first network identification number of the one of the first and second interfaces, for the one of the first and second interfaces.

6. An information processing device connectable to a network and including interfaces in which network identification numbers can be set, wherein the information processing device comprises a processor configured with programs to perform operations comprising:
   determining whether or not first and second interfaces of the interfaces are connected on a same network;
   stopping, when it is determined that the first and second interfaces are connected on the same network, one of the first and second interfaces; and
   setting, when it is determined that the first and second interfaces are connected on the same network, a first network identification number of the one of the first and second interfaces, in addition to a second network identification number of the other of the first and second interfaces, for the other of the first and second interfaces.

\* \* \* \* \*